(12) United States Patent
Zheng

(10) Patent No.: US 9,076,591 B2
(45) Date of Patent: Jul. 7, 2015

(54) HIGH ENERGY DENSITY ELECTROCHEMICAL CAPACITORS

(71) Applicant: Florida State University Research Foundation, Inc., Tallahassee, FL (US)

(72) Inventor: Jian-ping Zheng, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 265 days.

(21) Appl. No.: 13/676,480

(22) Filed: Nov. 14, 2012

(65) Prior Publication Data

US 2013/0070391 A1     Mar. 21, 2013

Related U.S. Application Data

(63) Continuation-in-part of application No. PCT/US2011/038901, filed on Jun. 2, 2011.

(60) Provisional application No. 61/350,776, filed on Jun. 2, 2010.

(51) Int. Cl.
*H01G 9/042* (2006.01)
*H01G 9/145* (2006.01)
(Continued)

(52) U.S. Cl.
CPC ............. *H01G 9/042* (2013.01); *H01G 9/0029* (2013.01); *H01G 9/145* (2013.01); *B82Y 99/00* (2013.01);
(Continued)

(58) Field of Classification Search
CPC ...... H01G 9/042; H01G 9/0029; H01G 9/145
USPC .................................................. 361/502, 508
See application file for complete search history.

(56) References Cited

U.S. PATENT DOCUMENTS

| 4,596,751 A | 6/1986 | Kunz et al. |
| 5,503,946 A | 4/1996 | Fauteux et al. |

(Continued)

FOREIGN PATENT DOCUMENTS

| EP | 1612819 | 1/2006 |
| JP | 2007242386 | 9/2007 |

(Continued)

OTHER PUBLICATIONS

International Search Report dated Oct. 4, 2011 for International Application No. PCT/US2011/038901, International Filing Date Jun. 2, 2011 consisting of 3 pages.

(Continued)

*Primary Examiner* — Jenny L Wagner
*Assistant Examiner* — Michael P McFadden
(74) *Attorney, Agent, or Firm* — Novak Druce Connolly Bove + Quigg LLP

(57) ABSTRACT

Electrochemical capacitors and methods for producing such electrochemical capacitors. The electrochemical capacitor can have an initial charged state and a cycled charged state and can include an anode, a cathode, and an electrolyte. The anode can include a first mixture having a first plurality of electrically conductive carbon-comprising particles having a first average porosity. The cathode can include a second mixture having a second plurality of electrically conductive carbon-comprising particles having a second average porosity greater than said first average porosity. The electrolyte can be physically and electrically contacting said anode and said cathode, and the first mixture in the cycled charged state can be substantially free of lithium metal particles and can further include a plurality of lithium ions intercalating the first plurality of carbon comprising particles. The mass ratio of the cathode and the electrolyte can be less than 1.

12 Claims, 20 Drawing Sheets

(51) Int. Cl.
*H01G 9/00* (2006.01)
*H01M 4/587* (2010.01)
*H01M 12/00* (2006.01)
*H01M 4/38* (2006.01)
*B82Y 99/00* (2011.01)
*H01M 10/42* (2006.01)

(52) U.S. Cl.
CPC .............. *Y10T 29/417* (2015.01); *H01M 4/587* (2013.01); *H01M 12/005* (2013.01); *H01M 2010/4292* (2013.01); *H01M 4/382* (2013.01)

(56) References Cited

U.S. PATENT DOCUMENTS

| | | |
|---|---|---|
| 7,315,441 B2 | 1/2008 | Kanno et al. |
| 2007/0171596 A1 | 7/2007 | Chacko et al. |
| 2007/0190422 A1* | 8/2007 | Morris ............ 429/231.4 |
| 2007/0298326 A1 | 12/2007 | Angell et al. |
| 2009/0148759 A1* | 6/2009 | Mitsuda et al. ........... 429/142 |

FOREIGN PATENT DOCUMENTS

| | | |
|---|---|---|
| JP | 2008252013 | 10/2008 |
| JP | 2009231297 | 10/2009 |
| JP | 2010050476 | 3/2010 |
| WO | 2005096333 | 10/2005 |

OTHER PUBLICATIONS

Nam et al., Novel concept of pseudocapacitor using stabilized lithium metal powder and non-lithiated metal oxide electrodes in organic electrolyte. Electrochemistry Communications. vol. 11: pp. 1166-1169, 2009.

* cited by examiner

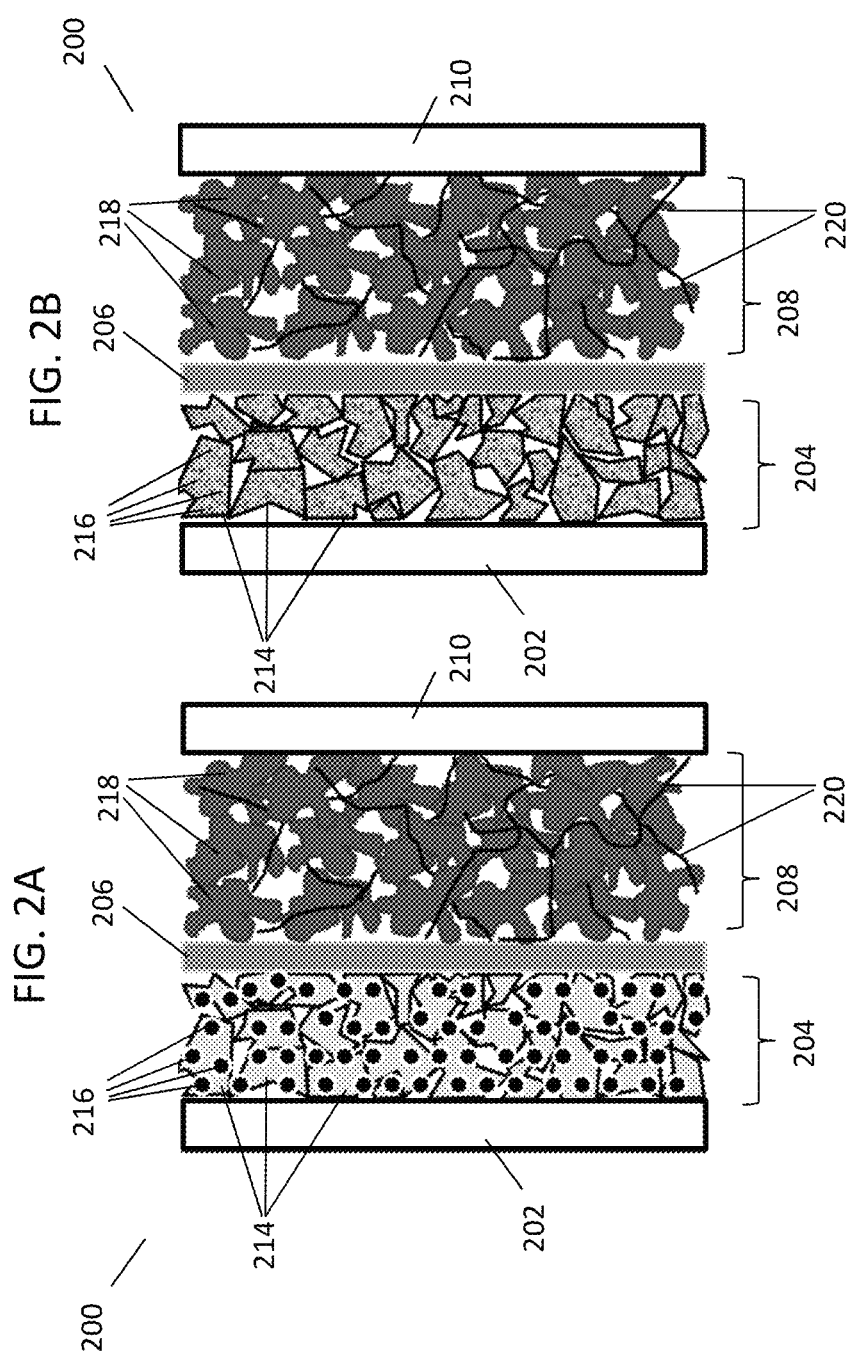

HIGH ENERGY DENSITY ELECTROCHEMICAL CAPACITORS

RELATED APPLICATIONS

This application is a continuation-in-part under 35 U.S.C. 111(a) of and claims priority to PCT patent application No. PCT/US2011/038901 for "HIGH DENSITY ELECTROCHEMICAL CAPACITORS", filed Jun. 2, 2011, which claims priority to U.S. Provisional Patent Application Ser. No. 61/350,776 for "HIGH DENSITY ELECTROCHEMICAL CAPACITORS", filed Jun. 2, 2010, both of which are hereby incorporated by reference in their entirety.

FIELD OF THE INVENTION

The invention pertains to electrochemical capacitors and more specifically to high energy density electrochemical capacitors.

BACKGROUND

Electrochemical (EC) capacitors (or supercapacitors) generally provide high power density, high reliability, high energy efficiency, and a long operating lifetime. Several types of EC capacitors have been developed for use in various fields. In the field of renewable energy, EC capacitors are commonly used for trimming the blades of windmills in response to wind changes and for energy storage generated by solar panels. In the field of transportation, EC capacitors are commonly used for operating rechargeable electric buses, for hybrid electric vehicles, and for energy storage during regenerative braking. In the field of consumer electronics, EC capacitors are used, for example, in cameras to help provide a burst of power for flash photography. EC capacitors can also be used in industrial settings to provide short bursts of power needed in equipment designed for heavy lifting (such as forklifts), as they provide a longer operating life than the traditional lead acid batteries. EC capacitors are also being used for automotive and utility applications as energy storage components.

SUMMARY

One embodiment relates to an electrochemical capacitor having an initial charged state and a cycled charged state. The electrochemical capacitor can comprise an anode, a cathode, and an electrolyte. The anode can comprise a first mixture. The first mixture can comprise a first plurality of electrically conductive carbon-comprising particles having a first average porosity. The cathode can comprise a second mixture. The second mixture can comprise a second plurality of electrically conductive carbon-comprising particles having a second average porosity greater than said first average porosity. The electrolyte can be physically and electrically contacting said anode and said cathode, wherein the first mixture in the cycled charged state is substantially free of lithium metal particles and further comprises a plurality of lithium ions intercalating the first plurality of carbon comprising particles, and wherein a mass ratio of said cathode and said electrolyte is less than 1.

The first mixture in the initial charged state can further comprise a plurality of lithium metal particles mixed with said first plurality of carbon-comprising particles. The first plurality of carbon-comprising particles in the initial charged state can be substantially free of lithium ions. The mass ratio of lithium metal particles and said first plurality of particles can be at least $2.59 \times 10^{-4} c_C$ or at least $2.59 \times 10^{-4} c_C*1.2$, wherein $c_C$ is the specific capacity of the first plurality of carbon-comprising particles. The first plurality of carbon-comprising particles can further comprise a plurality of hard carbon particles. The first plurality of carbon-comprising particles can consist of carbon-comprising particles selected from the group consisting of hard carbon, graphitic carbon, and carbon microbeads.

The second plurality of carbon-comprising particles can consist of a plurality of activated carbon particles. The plurality of activated carbon particles can be bound by a binder. The plurality of activated carbon particles can be bound by a network of carbon-comprising fibers. The network of carbon-comprising fibers can comprise a network of carbon nanotubes. The second plurality of carbon-comprising particles can also comprise a plurality of activated carbon particles, and stabilized lithium metal powder.

Another embodiment relates to a method of producing an electrochemical capacitor. The method can comprise: providing a housing having a first current collector, a second current collector, and an electrically insulating porous separating layer therebetween; disposing a first mixture on said first current collector, the first mixture comprising a plurality of lithium metal particles and a first plurality of electrically conductive carbon-comprising particles having a first average porosity; disposing a second mixture on said second current collector, the second mixture comprising a second plurality of electrically conductive carbon-comprising particles having a second average porosity greater than said first average porosity; and introducing an electrolyte into said housing.

The method can further comprise connecting a load between said first and said second current collectors to ionize substantially all of said plurality of lithium metal particles into a plurality of lithium ions suspended in said electrolyte and to draw said plurality of lithium ions towards said second mixture; and directing a charging current through said first and said second collectors to draw said plurality of lithium ions towards said first plurality of carbon comprising particles and intercalate said plurality of lithium ions into said first plurality of carbon comprising particles.

The step of disposing said first mixture can further comprise selecting the mass ratio of said plurality of lithium metal particles and said first plurality of particles to be $2.59 \times 10^{-4} c_C$ or $2.59 \times 10^{-4} c_C*1.2$, wherein $c_C$ is the specific capacity of the first plurality of carbon-comprising particles. The step of disposing of said first mixture can further comprise selecting the first plurality of carbon-comprising particles to comprise a plurality of hard carbon particles. The step of disposing of said first mixture can further comprise selecting the first plurality of carbon-comprising particles to consist of carbon-comprising particles selected from the group consisting of hard carbon, graphitic carbon, and carbon microbeads.

The step of disposing said second mixture can further comprise selecting the said second plurality of carbon-comprising particles to comprise of a plurality of activated carbon particles. The step of disposing said second mixture can further comprise binding said plurality of activated carbon particles with a binder. The step of disposing said second mixture can further comprise binding said plurality of activated carbon particles with a network of carbon-comprising fibers. The step of binding can further comprise forming said network of carbon-comprising fibers using a network of carbon nanotubes. The step of disposing said second mixture can further comprise selecting the said second plurality of carbon-comprising particles to comprise a plurality of activated carbon particles, and stabilized lithium metal powder.

BRIEF DESCRIPTION OF THE DRAWINGS

FIG. 2A is a schematic of an EC capacitor in accordance with an embodiment of the invention prior to a first charge/discharge cycle.

FIG. 2B is a schematic of an EC capacitor in accordance with an embodiment of the invention after a first charge/discharge cycle.

FIGS. 19A and 19B show, respectively, cycling performance and charge and discharge curves at various charge and discharge rates.

DETAILED DESCRIPTION

Figure 1A:
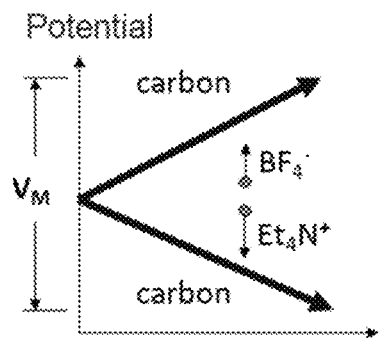
FIG. 1A is a schematic of potential changes during the charge-discharge process in a conventional symmetrical cell with two double-layer electrodes.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, EC capacitors provide several advantages. However, the typical energy density of conventional EC capacitors is generally less than 10% of that of conventional rechargeable batteries. As a result, a significant amount of effort has been directed to understanding the relationship of the pore size to the ionic accessibility from the electrolyte and developing various pseudo-capacitance materials in order to maximize the charge storage capability. However, an improvement in the charge storage capability of electrode materials cannot resolve the issue of low energy density in EC capacitors since energy density is strongly dependent on the active role of the electrolyte during charging and discharging processes.

In conventional double layer EC capacitors, the ion concentration in the electrolyte increases and decreases during charge and discharge cycles, respectively. As a result, the energy density of an EC capacitor can be estimated based on the charge balance between the electrode and electrolyte during the charge and discharge process. For example, the maximum theoretical energy density of a double layer capacitor can be expressed as:

$$\varepsilon = \frac{1}{8} c_p V_M^2 \frac{1}{1 + (c_p V_M)/(4\alpha c_o F)} \quad (1)$$

where $c_p$ is the specific capacitance of electrode material, $V_M$ is the maximum operational voltage of the cell, $c_o$ is the electrolyte ion concentration, F is Faraday's constant and equal to 96,484 C/mol and α is a non-unit constant less than 1. This constant represents the fraction of total salt removed from the bulk electrolyte upon completion of charging. However, when the specific capacitance of the electrode is high enough or the ion concentration is low enough, Equation (1) provides for $(c_p V_M)/(4\alpha c_o F) \gg 1$. Thus, the energy density of the capacitor becomes independent of the specific capacitance of the electrode and is instead proportional to the ion concentration and the maximum operational voltage.

In order to increase the energy density as compared to conventional EC double-layer capacitors, an asymmetric cell which consists of a conventional battery electrode (such as lithium intercalated compound) as the anode and a double-layer capacitor electrode (such as activated carbon) as the cathode has been developed and has been shown to provide improved energy density (as shown below in Table 1). However, the maximum energy density of such asymmetric cells and conventional battery/double-layer capacitors are ultimately limited by the ion concentration of the electrolyte. Therefore, energy densities in conventional EC double-layer capacitors and asymmetrical cells are generally limited by salt-consuming charging/discharging processes, as described below.

Figure 1B:
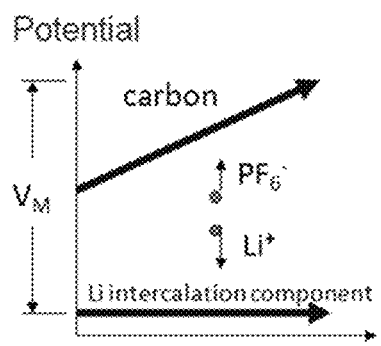
FIG. 1B is a schematic of potential changes during the charge-discharge process in a conventional asymmetric cell with double-layer and intercalation electrodes.

FIGS. 1A and 1B schematically illustrate ion transfer in electrolytes during a charge process for conventional symmetric cells and conventional asymmetric cells, respectively. For conventional EC double-layer capacitors and asymmetrical cells, the anions ($BF_4^-$ and $PF_6^-$) and cations ($Et_4N^+$ and $Li^+$) are consumed during charge processes, as shown in FIGS. 1A and 1B. In FIGS. 1A and 1B, electrons move from the positive electrode to the negative electrode through the external load during the charging process. At the same time, ions are separated from the bulk electrolyte and are accumulated near the electrode surface or inserted into the bulk electrode. During the discharge of these cells, the electrons move from the negative electrode to the positive electrode, and ions are released from the electrode surface or bulk into the electrolyte. However, according to energy density theories, the charge from the ions in the electrolyte must match with that in electrode. Therefore, the mass of electrolytes in such conventional EC capacitors is typically required to be at least 1.5 to 3 times the mass of the two electrodes to provide proper charge matching.

To overcome the limitations of conventional EC capacitors, the various embodiments of the invention provide a new asymmetric, Li ion based EC capacitor. In particular, an EC capacitor is provided in which charging and discharging is based on the result of Li ions shuttling between two electrodes to provide a constant ion concentration during charge and discharge cycles. In the various embodiments of the invention, the EC capacitor is configured to include carbon-based electrodes where a cathode electrode is configured to have a greater porosity than the anode electrode. Further, a Li pre-inserted anode electrode is provided. That is, the anode electrode is fabricated with a Li metal material which is subsequently ionized during a first discharging process. Such a configuration provides a constant Li ion concentration in the electrolyte. Therefore, Li ions shuttle between anode and cathode electrodes during the charge and discharge cycles in a manner similar to that observed in Li-ion batteries. Therefore, since no salt in the electrolyte is consumed during the charge and discharge cycles, lower amounts of electrolyte can be used. Accordingly, EC capacitors (Li-ion capacitors) in accordance with the various embodiments of the invention provide an energy density comparable to advanced rechargeable batteries and power densities greater than conventional EC capacitors, while significantly reducing the amount of electrolyte needed. Thus, a lower overall mass is provided for EC capacitors in accordance with the various embodiments of the invention.

Figure 1C:
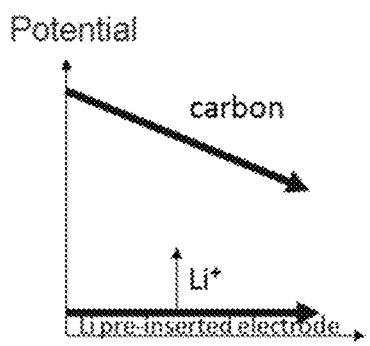
FIG. 1C is a schematic of potential changes during the charge-discharge process in an EC capacitor in accordance with the various embodiments of the invention.

In the various embodiments of the invention, charge transfer is obtained using Li ion shuttling during charge and discharge cycles, as shown in FIG. 1C. In such a configuration, the ion shuttling between the two electrodes results in the ionic concentration in the electrolyte not significantly changing during the charge and discharge processes. Thus, the maximum energy density will instead be determined by the specific capacitance of the capacitor electrode, the specific capacity of the battery electrode, and the maximum operational voltage of the cell.

As a result of utilizing shuttling of Li ions and maintaining the ion concentration of the electrolyte substantially constant, the energy density of EC capacitors can be significantly higher than that of comparable symmetric and asymmetric capacitors, as shown below in Table 1.

TABLE 1

EC Capacitor Characteristics

| Energy storage cells | Symmetric EC capacitor | Asymmetric EC capacitor | Li-ion EC capacitor |
| --- | --- | --- | --- |
| Specific capacitance/ capacity of anode | 100 F/g | 160 mAh/g | 160 mAh/g |
| Specific capacitance of cathode | 100 F/g | 100 F/g | 100 F/g |
| Maximum voltage | 2.7 V | 3.2 V | 3.2 V |
| Electrolyte | 1M $Et_4NBF_4$ PC | 1M $LiPF_6$ EC:DMC | 1M $LiPF_6$ EC:DMC |
| Mass ratio ($m_A/m_C/m_I$)* | 1/1/3.0 | 1/3.76/7.16 | 1/2.22/1.71 |
| Energy density | 7.6 Wh/kg | 27 Wh/kg | 63 Wh/kg |

*$m_A$, $m_C$, and $m_I$ represent masses of anode, cathode, and electrolyte, respectively.

For purposes of Table 1, the energy density was calculated based on the total mass of the anode, the cathode, and the electrolyte in each of the three configurations, and using comparable specific capacitances for the anode and cathode. Further, the same or equivalent electrolytes were used for generating the values in Table 1. Despite the similarities in the structures used in Table 1, the use of Li-ion shuttling results in an energy density as high as 63 Wh/kg. Such an energy density is significantly greater than comparable conventional symmetric and asymmetric cells, which provide energy densities of about 7.6 and 27 Wh/kg, respectively.

An exemplary configuration for an EC capacitor in accordance with an embodiment of the invention is shown in FIGS. 2A and 2B. FIG. 2A schematically illustrates the configuration of a pristine EC capacitor 200 in accordance with an embodiment of the invention. FIG. 2B schematically illustrates the configuration of the EC capacitor 200 in FIG. 2A after a discharge/charge cycle.

As shown in FIGS. 2A and 2B, EC capacitor 200 includes an anode current collector 202, an anode electrode 204, a separator portion 206, a cathode electrode 208, and a cathode current collector 210, and an electrolyte (not shown) therebetween. In the various embodiments of the invention, current collectors 202 and 210 can be formed from any type of electrically conductive materials that are non-reactive with electrolyte 212. The separator 206 can be formed from any type of electrically insulating materials, non-reactive with electrolyte 212 and electrodes 204 and 208, but with a sufficient porosity to permit Li ions to travel between electrodes 204 and 208 via the electrolyte.

The electrolyte used in the various embodiments of the invention can be a same or similar electrolyte as those used in conventional Li-ion batteries. That is, the electrolyte should be formed from an appropriate salt and an appropriate solvent mixture. For example, such electrolytes can include high dielectric constant carbonate solvents such as ethylene carbonate (EC) and propylene carbonate (PC), which are able to dissolve sufficient amounts of lithium salt, low viscosity carbonate solvents such as dimethyl carbonate (DMC) and diethyl carbonate (DEC) for high ionic conductivity, and Ether solvents such as tetrahydrofuran (THF) dimethoxyethane (DME) for improved lithium morphology in order to suppress dendritic lithium growth during the cycles. Further, the choice of salt will be based on some widely used salts such as lithium perchlorate ($LiClO_4$), lithium hexafluoroarsenate ($LiAsF_6$), and lithium tetrafluoroborate ($LiBF_4$), to name a few. However, the various embodiments of the invention are not limited in this regard and other solvents and salts can be used in the various embodiments of the invention.

In capacitor 200, the anode electrode 204 is configured as a plurality of particles including lithium intercalation carbon particles 214 having a high specific capacity. As used herein, the term "lithium intercalation carbon" refers to any composition of carbon into which Li ions can diffuse into the spaces between the carbon atoms within the composition and bond with surrounding carbon atoms. Lithium intercalation carbon particles can include hard carbon particles, graphitic carbon, and/or carbon microbeads, to name a few. The term "hard carbon", as used herein refers to carbon with an amorphous structure or that is non-graphitizable. In one embodiment of the invention, the hard carbon particles can have a hard carbon composition having a specific capacity from 300 to 700 mAh/g and excellent charge/discharge cyclability as compared to conventional graphitic carbon. Such a configuration provides a high Li storage capacity for the anode electrode 204 and long cycle life of the cell. However, the various embodiments are not limited in this regard and any type of lithium intercalating carbon particles can be used in the various embodiments of the invention.

During assembly of capacitor 200, an amount of Li metal particles 216 is uniformly mixed with the lithium intercalating carbon particles 214 so that anode electrode 204 is initially a composite anode electrode. In the various embodiments of the invention, it is desirable that little or no metallic Li should be left in anode electrode 204 after discharge in order to minimize the likelihood of subsequent Li dendrite formation, which can limit the cycle life of the EC capacitor. Therefore, in the various embodiments of the invention, the mass ratio between Li ($m_{Li}$) and the carbon ($m_C$) in the anode electrode can be expressed as:

$$\frac{m_{Li}}{m_C} = \frac{c_C w_{Li}}{F} = 2.59 \times 10^{-4} c_C (mAh) \quad (2)$$

where, $c_C$ is the specific capacity of carbon in the anode electrode, $w_{Li}$ is the atomic weight of Li (6.941 g/mol), and F is Faraday constant (96,485 C/mol). For example, the mass ratio can be 0.0777, 0.129, and 0.181 when $c_C$ is 300, 500, and 700 mAh, respectively. However, the amount of Li powder in the anode electrode can also be selected in consideration that the initial coulombic efficiency is low due to the solid-electrolyte interface layer formation. Therefore, considering the initial low coulombic efficiency expected, the mass of Li can be 20% to 30% more than the values obtained from the calculation according to Equation (2). In practice, the stabilized lithium metal powder (SLMP) may not be totally converted from metal form to ionic form after the first charge/discharge cycle and some residual SLMP can remain in the electrode; therefore, the amount of SLMP in the anode electrode can be more than the minimum required amount as described by Eq. (2) above, the amount of SLMP could be 20% to 200% of the amount which calculated by Eq. (2).

In addition to the hard carbon, other lithium-intercalated components such as graphitic carbon or graphite and $Li_4Ti_5O_{12}$ can also be used in the anode.

In contrast, the cathode electrode 208 can be configured as a plurality of carbon particles 218 having a porosity significantly greater than that of the carbon particles 214 in order to provide a larger surface area for forming an electric double layer. For example, in some embodiments of the invention, activated carbon is used. In addition to hard carbon/SLPM anode and activated carbon structure, SLMP can also be integrated in the cathode electrode to have a hard carbon anode and activated carbon/SLMP cathode structure when the capacitor is initially assembled.

In the various embodiments of the invention, the structure and composition of the cathode electrode 208 can vary. For example, in some embodiments of the invention, the carbon particles 218 in cathode electrode 208 can be attached to each other using a binder. Exemplary binders include polyvinylidene fluoride (PVDF) and polytetrafluoroethylene (PTFE). However, the various embodiments of the invention are not limited in this regard and other binders can also be used.

In another example, the cathode electrode 208 can also be formed from one or more free-standing sheets or membrane-like materials composed of carbon nanotubes (CNTs) 220 and activated carbon particles 218 without the use of any adhesive binders. In such a configuration, the activated carbon particles 218 are embedded in a network or matrix of single-walled or multiple-walled carbon CNTs 220. The highly dispersed and entangled network of CNTs 220 provides essential high electrical conductivity, mechanical strength and durability which allows for the free-standing and binder-free characteristics. Further, the high aspect ratio of the entangled CNTs allows for the incorporation of micron sized particles within the network structure. The absence of binders, which block surface pores and thus decrease usable surface area, therefore allows for maximum adsorption of desired materials onto the highly microporous surface of the activated carbon particles 218.

The typical electric conductivity of conventional carbon cathode electrodes can be high, such as greater than 1 S/cm. However, an carbon cathode electrode consisting of activated carbon and CNT composite electrodes can have an electric conductivity of ~100 S/cm. This is at least 100 times greater than an electrode made with activated carbon alone. Further, a specific capacitance of 120 F/g was obtained from cathode electrodes for both activated carbon with binder and activated carbon/CNT composite. Additionally, the open-circuit voltage (OCV) of composite cathode electrode was about 3 V vs. Li. In general, in order to achieve an energy density above 63 Wh/kg (as shown in Table 1) for an EC capacitor with a cathode electrode porosity of 50% and operational voltage of 3.2 V, the OCV must be above 2.6V vs. Li.

The manufacturing process for such a cathode electrode can be a wet filtration process. In this process, CNTs and activated carbon particles are first dispersed in a solution to create a stable or semi-stable suspension. A number of surfactants may be used to aid in the dispersion of aqueous CNT suspensions. Suspensions using inorganic or organic solvents can also be fabricated using a variety of solvents (alcohols, acetone, DMF etc.) Once a well dispersed suspension is created it is then filtered through a microporous membrane with vacuum and/or positive pressure. Membrane materials can have pore sizes in the sub-micron range. Upon drying, the filtered carbon material configures into a solid sheet and can be peeled off the filtration membrane. If a surfactant is used as a dispersing agent to create the suspension, there can be residual surfactant within the material after fabrication and can be removed if so desired. This can be performed via washing in various solvents (isopropanol, ethanol, methanol, acetone, etc.) and/or a heat treatment process at temperatures above the surfactant decomposition temperature.

Referring back to FIGS. 2A and 2B, operation of the EC capacitor will now be described. During the first discharge cycle, a load is connected across current collectors 202 and 210. As a result, substantially all the Li metal particles 216 shown in FIG. 2A are converted into Li ions and electrons (Li→Li$^+$+e$^-$). As the EC capacitor discharges (i.e., electrons flow out of current collector 202 and flow into current collector 210), the cathode electrode 208 accumulates a negative charge and the Li ions are drawn from the anode electrode 204 to the cathode electrode 208 and accumulate at the interface of the cathode electrode 208 and the electrolyte 212. Thus, a double-layer is formed.

In the following charging cycle, the EC capacitor is connected to a source of a charging current (i.e., electrons flow into current collector 202 and electrons flow out of current collector 210). As a result of the negative charge accumulates in anode electrode 204 and the Li ions are drawn back towards anode electrode 204. However, since substantially all the Li metal is converted to Li ions, there is no Li metal surface to which the Li ions can bond to. Therefore, the Li ions do not revert to Li metal particles. Instead, the Li ions will be intercalated into the carbon particles 214 in anode electrode 204. Accordingly, the carbon particles 214 in the anode electrode 204 become lithiated carbon particles 222, as shown in FIG. 2B. This avoids the significant issues associated with lithium dendrite formation. During a subsequent charging cycle, at least a portion of the intercalated Li ions are transported back towards the cathode electrode 208. That is, a portion of if the Li ions may be irreversibly intercalated. Thereafter, this process can repeat for each charge/discharge cycle.

Figure 3:
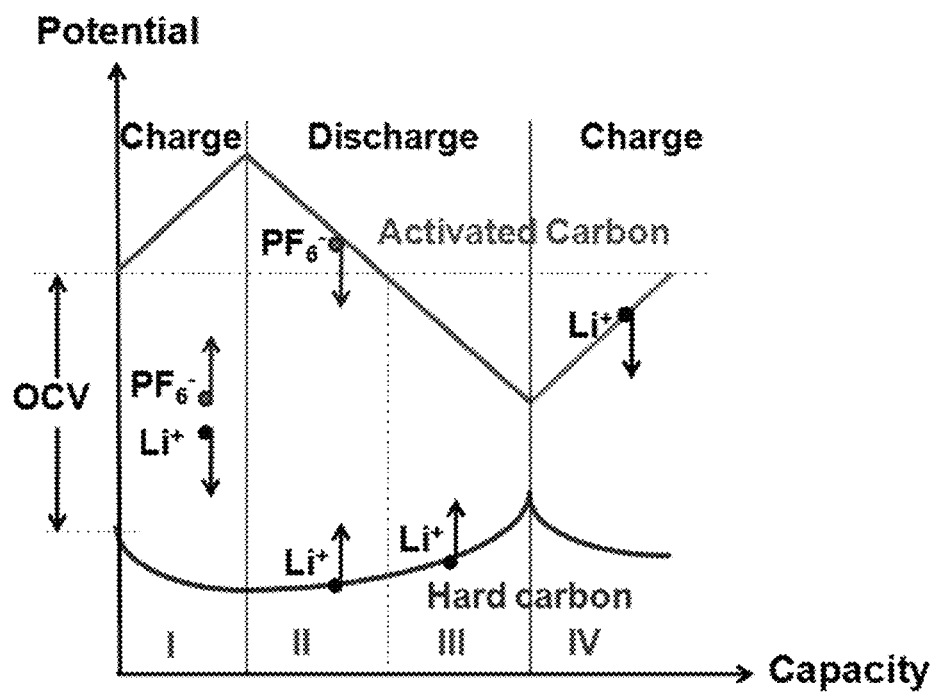
FIG. 3 is a schematic of ion transfer in the Li-ion capacitor when the cell voltage is greater (I and II) and lower (III and IV) than OCV.

The charge transfer during charge and discharge cycling for a Li-ion capacitor can be explained by diagram of FIG. 3. When the cell voltage is less than open-circuit voltage (OCV), the charge transfer process can be expressed as:

$$\text{Anode: } Li^+ + e^- \leftrightarrow Li \qquad (3)$$

$$\text{Cathode: } Li^+//e^- \leftrightarrow Li^+ + e^- \qquad (4)$$

In Eq. (3), the Li is in metal form or intercalates in HC, during the first or after the first cycle, respectively. Li$^+$//e$^-$ represents double layer charges at cathode. The Li-ion shuttles between two electrodes and no electrolyte is consumed during charge and discharge processes. However, when cell voltage is charged to the voltage which is greater than the OCV of the cell, the salt in the electrolyte will be consumed during the charge process. The charge transfer process can be expressed as:

$$\text{Anode: } Li^+ + e^- \leftrightarrow Li \qquad (5)$$

$$\text{Cathode: } PF_6^- + e^- \leftrightarrow PF_6^-//e^+ \qquad (6)$$

$$\text{Overall: } Li^+ + PF_6^- \leftrightarrow Li + PF_6^-//e^+ \qquad (7)$$

where, $PF_6^-//e^+$ represents the double-layer charges with the negative charge of $PF_6^-$ in the electrolyte side and the positive charge $e^+$ in cathode electrode side. It can be seen that during charge process, the salt $LiPF_6=Li^++PF_6^-$ in the electrolyte is consumed. The total charge required by both electrodes from the electrolyte is:

$$Q_C = m_C c_C (V_M - V_{OCV}) \qquad (8)$$

It can be seen from Eq. (8) that the higher the OCV, the less electrolyte will be consumed. Electrolyte will be used even if the system does or does not consume electrolyte, because the all pore volume in both electrodes and separator must be filled with electrolyte for there to exist an ionic conductive path. In order to insure that the ions in the electrolyte will not be depleted in the Li-ion capacitors, the amount of electrolyte must contain enough salt which guarantees that the total charges are greater than $Q_C$ described in Eq. (8).

Figure 4:
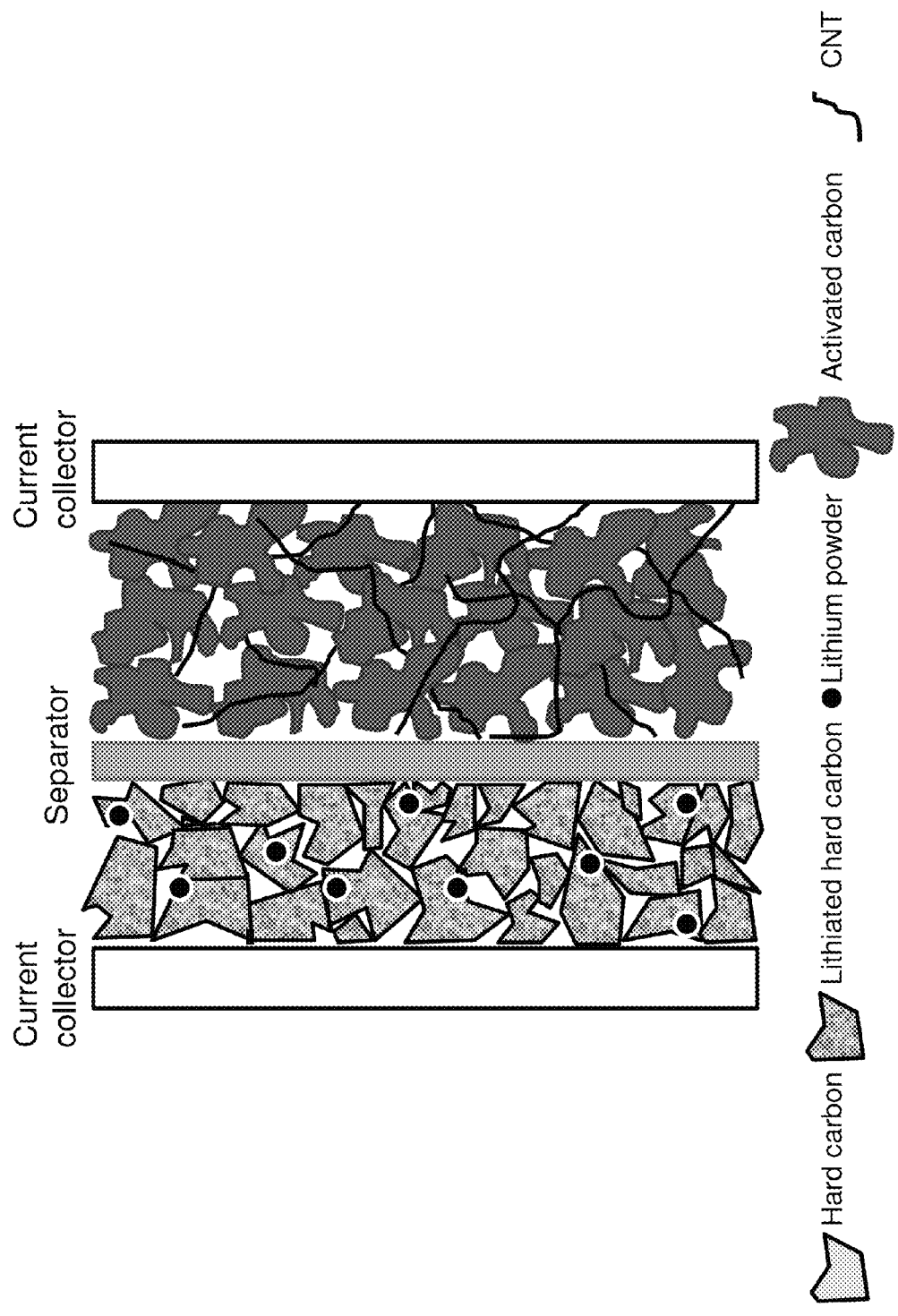
FIG. 4 is a schematic of an EC capacitor in accordance with an embodiment of the invention after a first charge/discharge cycle with some residues of SLMP.

It is likely that some of the SLMP in the electrode will not be converted to Li ions due to poor electrical connection to the entire electrode; therefore, after the first charge/discharge cycle, these SLMP will remain in the electrode as shown in FIG. 4. The remaining SLMP in the electrode was not included in the Eq. (2) for calculating the mass ratio between Li and the carbon.

Figure 5:
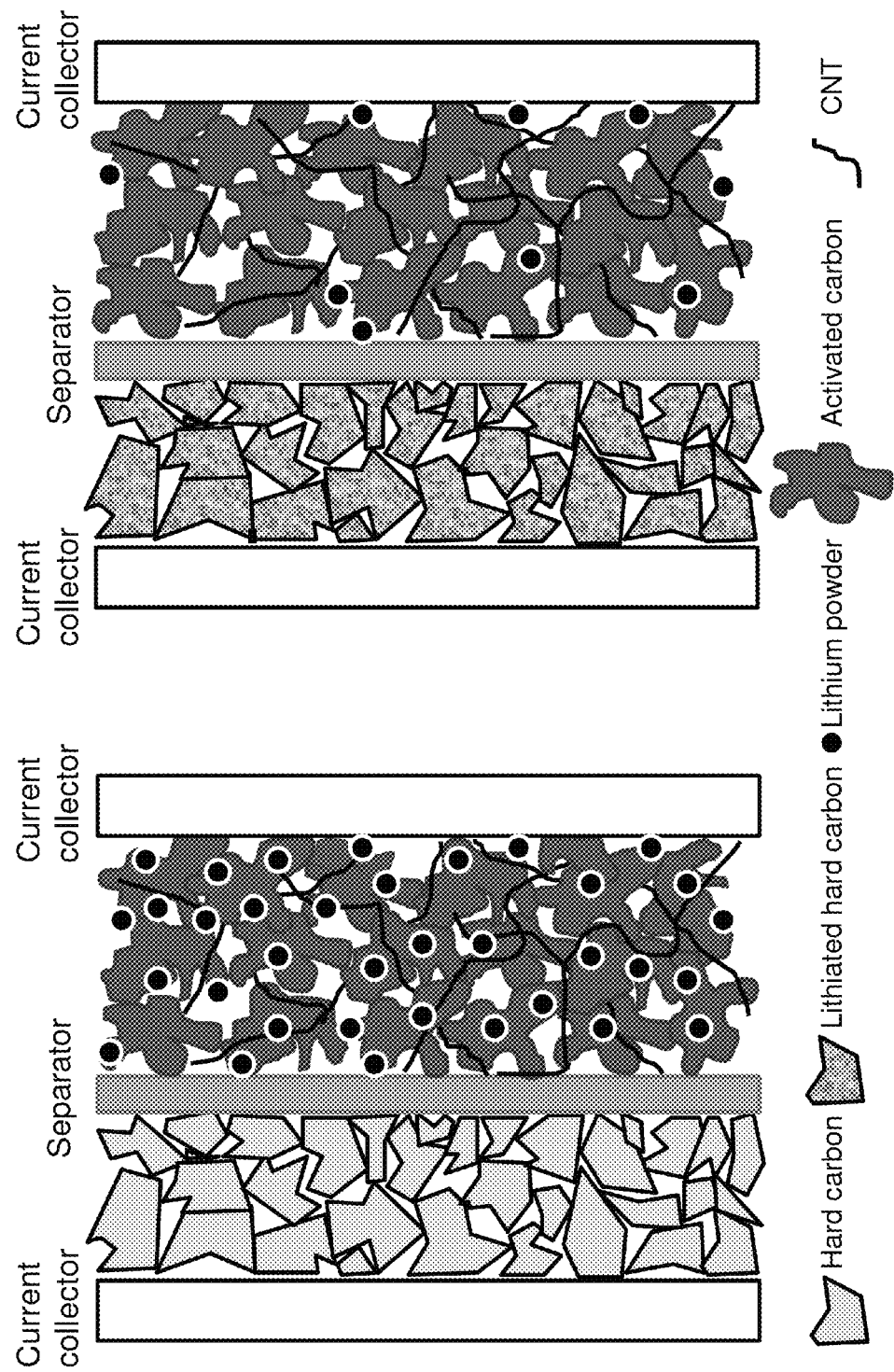
FIG. 5A is a schematic of an EC capacitor in accordance with an embodiment of the invention prior to a first charge/discharge cycle.
FIG. 5B is a schematic of an EC capacitor in accordance with an embodiment of the invention after a first charge/discharge cycle.
Figure 6:
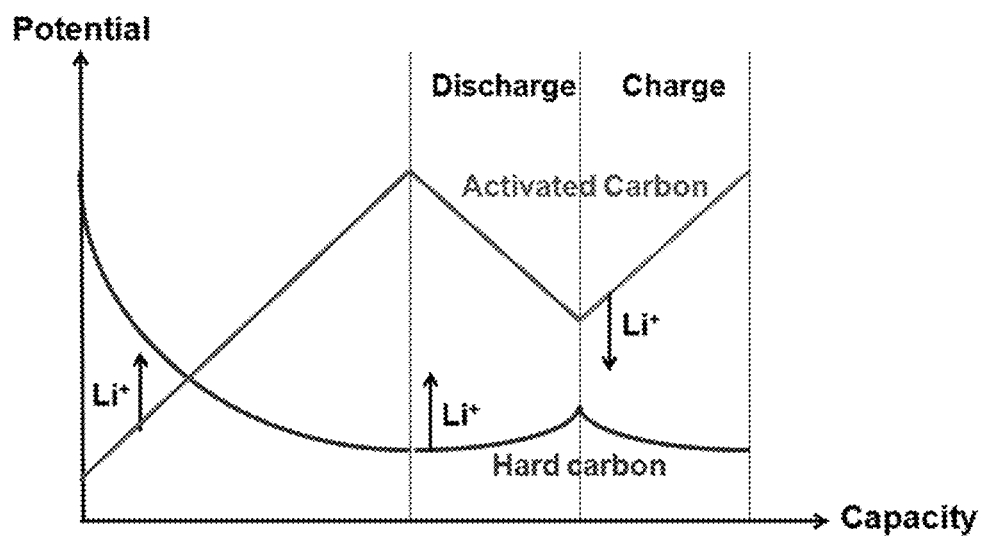
FIG. 6 is a schematic diagram of a Li-ion capacitor configuration with SLMP in cathode electrode and the charge transfer between two electrodes during initial charge and discharge cycling.

The Li-ion capacitor consisting of a hard carbon/SLMP anode and activated carbon cathode was demonstrated and charge storage and transfer mechanisms have been discussed. A fundamental difference in the characteristics between Li-ion capacitors and conventional capacitors is that the salt (ion) concentration in the electrolyte is almost constant during the charge and discharge cycling in Li-ion capacitors; however, such characteristics for Li-ion capacitors can be achieved by alternative electrode configurations. One such configuration is that the Li-ion capacitor can be made with a Li-intercalated carbon anode and activated carbon/SLMP cathode as shown in FIG. 5. During the first charge process, Li-ions transfer from cathode electrode and intercalate in the Li-intercalated carbon anode electrode. The charge transfers during charge and discharge cycles are illustrated in FIG. 6. The anode electrode is made with other Li-intercalated materials such as the hard carbon, graphitic carbon or graphite, $Li_4Ti_5O_{12}$, and other Li-intercalated components.

The overall performance of EC capacitors in accordance with the various embodiments of the invention is strongly dependent on how the cell is assembled. In general, such EC capacitors can be assembled according to the charge balance theory for achieving the maximum energy density, as described above. Further, such EC capacitors can be designed to minimizing the internal resistance in order to maximize the power density of the Li ion capacitors. That is, the optimal mass ratio, optimal porosity for energy and power densities, and swing voltage of the cell can be determined by theoretical modeling. Thereafter, the energy density of the cell can be validated through charge and discharge cycles. For example, a detailed internal resistance distribution including electrical and ionic resistance, and contact resistance in the EC capacitor can be analyzed from electrochemical impedance spectra combined with the equivalent circuit model of Li-ion capacitors. Other performance measures, such as the cell temperature stability, vapor pressure under full charged condition, self-discharge (leakage) current, and cycle life can also be evaluated to enhance design and assembly of EC capacitors in accordance with the various embodiments of the invention. For example, in one embodiment of the invention, a prismatic cell configuration can be used. Such a configuration allows pressure to be applied in order to keep the cell tightly compacted even after Li ions intercalate into the anode electrode, despite the slight reduction in the total volume of anode electrode typically associated with the intercalation process.

EXAMPLES

The examples shown here are not intended to limit the various embodiments. Rather they are presented solely for illustrative purposes.

Example 1

Figure 7B:
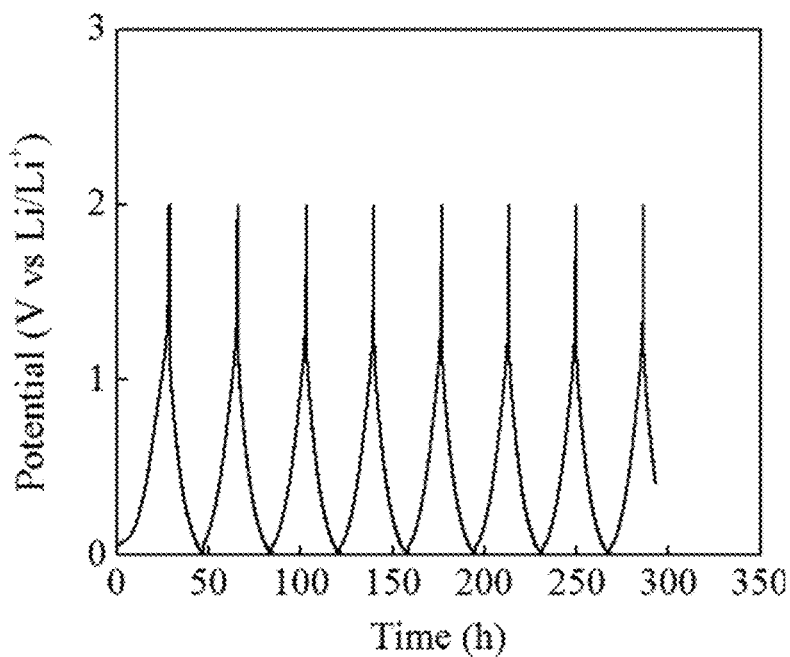
FIGS. 7A and 7B show, respectively, the voltage profiles of hard carbon/SLMP electrode during charge and discharge cycling at a constant density of 80 μA/cm² for weight ratios of hard carbon:SLMP=10:1 and hard carbon:SLMP=5:1.

Based on the foregoing discussion, a Li-ion capacitor was developed based on the concept of that Li-ions are pre-doped in anode electrode. Our approach was that the anode was made with mixture of hard carbon (HC) and SLMP. After the completion of the first cycle, the Li metal became Li-ion which was inserted into HC. This is illustrated in FIGS. 7A and 7B.

Figure 7A:
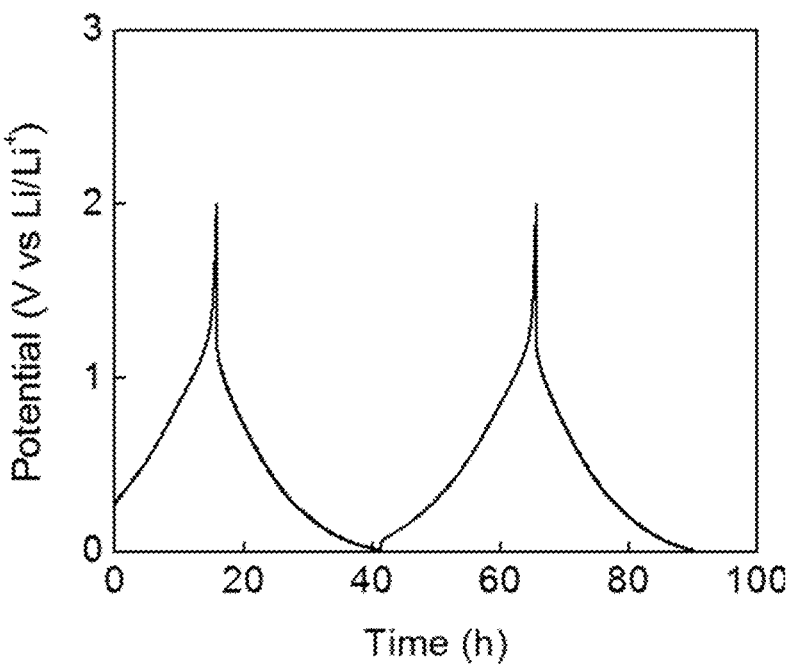

FIG. 7A shows the voltage profile of an anode electrode charge and discharge at potential 0-2 V vs. Li/Li$^+$. The anode electrode was made with mixture HC:SLMP:PVDF (polyvinylidene fluoride as binder) at a ratio of 10:1:0.6 by weight. The open circuit potential (OCP) of the electrode was 0.3-0.4 V vs. Li/Li$^+$. The discharge capacity of HC was found to be about 200 mAh/g, which is lower than the graphitic carbon used in Li-ion batteries. It was found that that the OCP is a function of the ratio between HC and SLMP. For example, when the SLMP increased to HC:SLMP=5:1, the OCP of the electrode reduced to about 0.01-0.02 V vs. Li/Li$^+$. FIG. 7B shows a potential profile during charge and discharge cycling.

The cathode electrode was made with mixture of activated carbon (AC), carbon black (CB) Valcan XC-72), and PTFE (polytetrafluoroethylene as binder) at a ratio of 10:1:1 by weight. The OCP of the cathode electrode was found to be about 3 V vs. Li/Li$^+$. The high OCP is essential for the minimization of the ion consumption in the electrolyte.

Figure 8:
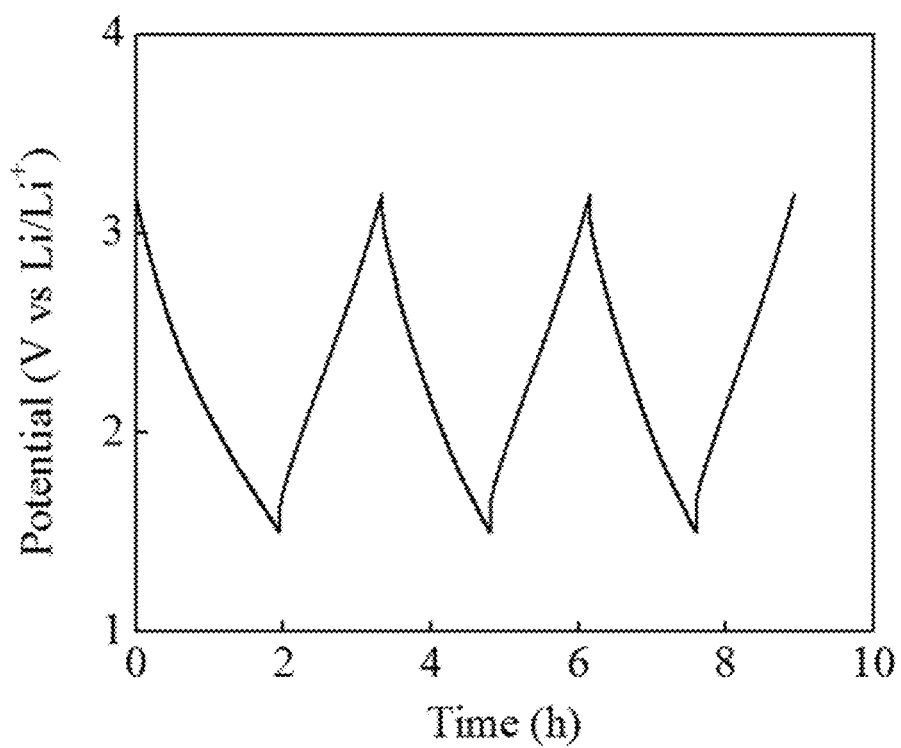
FIG. 8 The voltage profile of activated carbon electrode during charge and discharge cycling at a constant density of 0.4 mA/cm².

FIG. 8 shows the voltage profile of a cathode electrode which was cycled at potential 1.5-3.2 V vs. Li/Li$^+$. The average specific capacitance in this potential range was calculated to be about 120 F/g.

Figure 9:
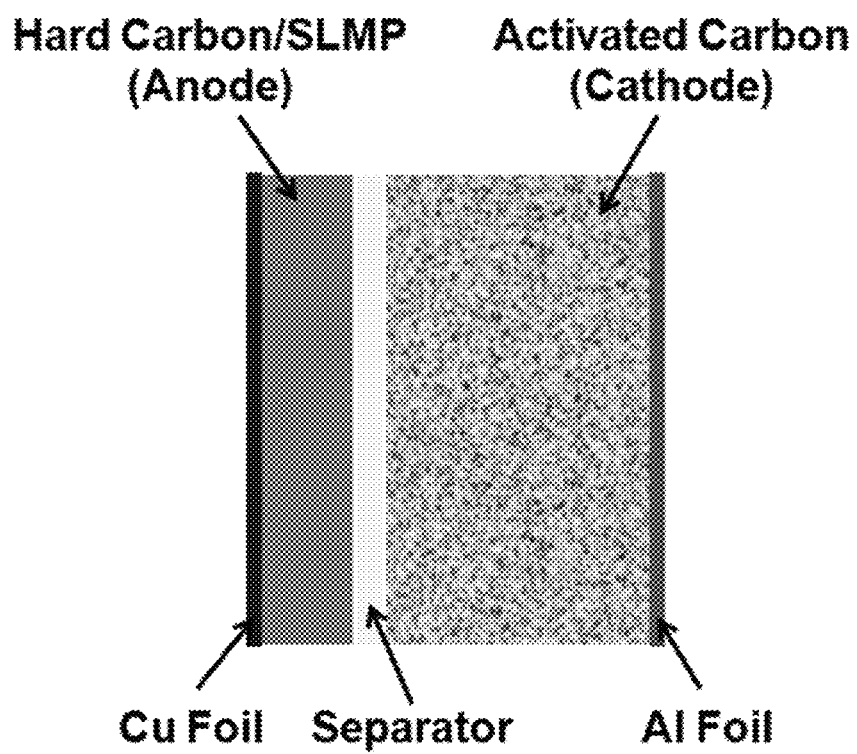
FIG. 9 shows a schematic diagram of a Li-ion capacitor configuration.

Li-ion capacitors were assembled in order to demonstrate the high energy density, predicated theoretically, and to prove the concept of no consumption of salt from the electrolyte. FIG. 9 shows the schematic diagram of the constructed Li-ion capacitor. The material compositions of a typical Li-ion capacitor can be described as follows: The anode and cathode were made with HC:SLMP:PVDF and AC:CB:PTFE, respectively, as described previously. The separator was a microporous membrane (Celgard 3501). The electrolyte was 1 M LiPF$_6$ in ethylene carbonate (EC):dimethyl carbonate (DMC):diethyl carbonate (DEC) at a ratio of 1:1:1 by weight. The copper and aluminum foils were used as current collectors of anode and cathode electrodes, respectively.

Figure 10A:
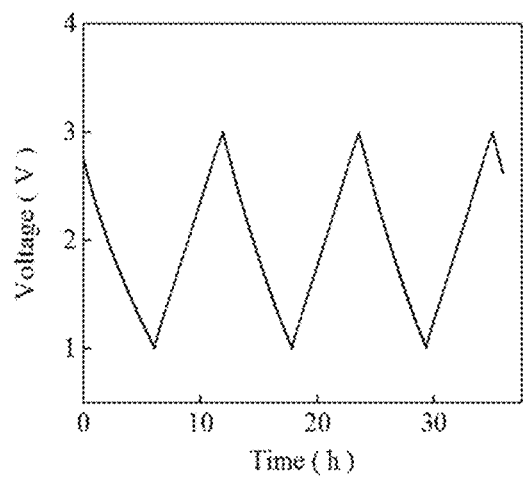
FIGS. 10A-10C illustrate, respectively the voltage profiles of Li-ion capacitors during charge and discharge cycling from a first cell at a constant density of 80 μA/cm², a second cell at a constant density of 80 A/cm², and from a third cell at constant density of 0.8 mA/cm².
Figure 10B:
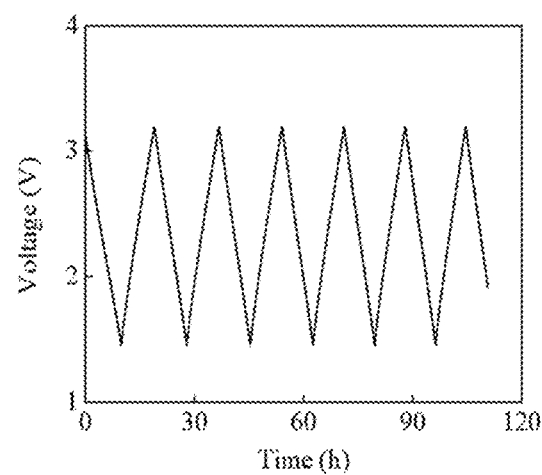
Figure 10C:
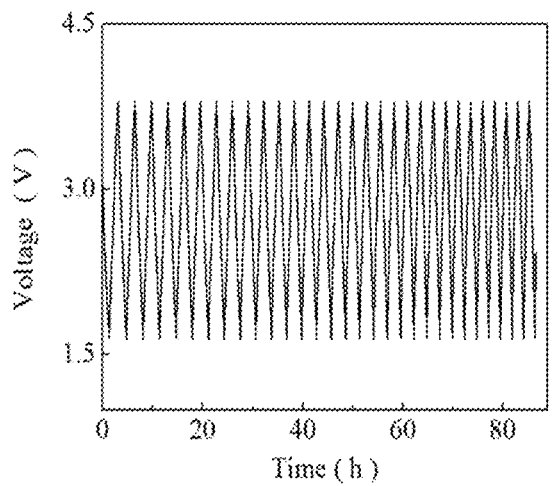
Figure 11A:
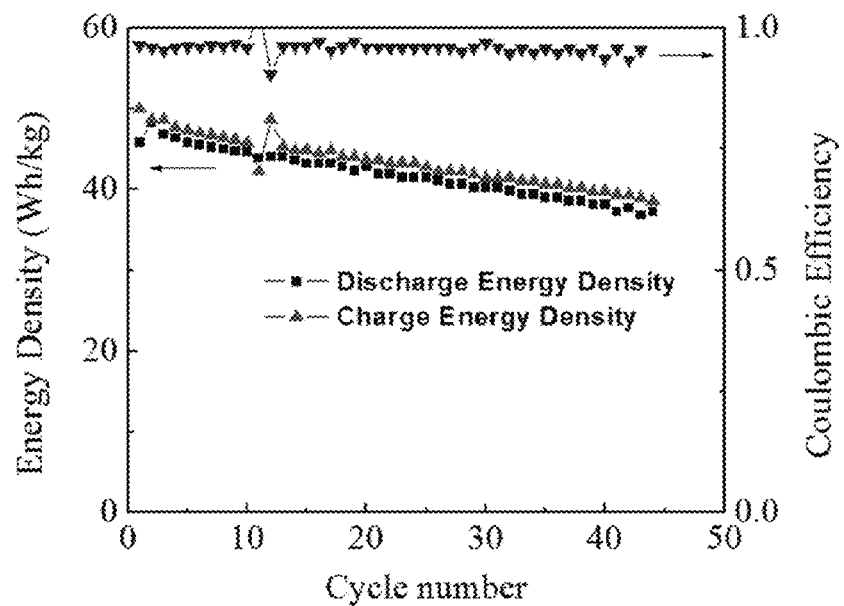
FIGS. 11A and 11B show charge/discharge energy densities and the energy efficiency as a function of the cycle number for the first cell and the third cell in FIGS. 11A-11C.
Figure 11B:
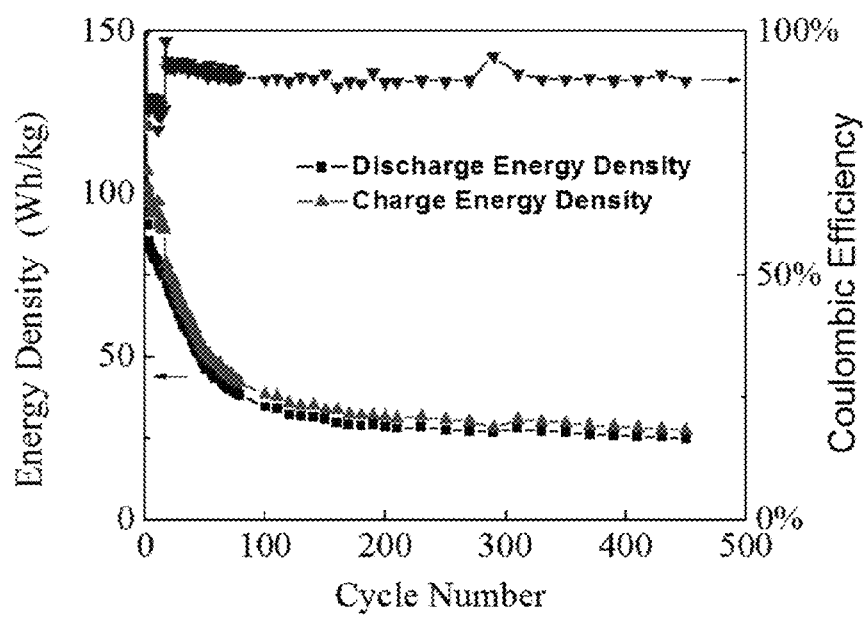

FIGS. 10A-10C shows the voltage profiles during the discharge-charge cycles from three different cells. The maximum charge voltages of three cells were different. The cell #1 had less ratio of SLMP in anode electrode than that of cells #2 and #3. The detailed material compositions and the capacities of electrodes of were listed in Table 2. The theoretical energy density was estimated using following equation:

$$\varepsilon = \frac{\frac{1}{2}(V_{max} + V_{min})C_B}{m_A + m_C} \qquad (9)$$

where, $V_{max}$ and $V_{min}$ are the maximum and minimum cell voltages, respectively. $C_B$ is the lower capacity value between anode and cathode. $m_A$ and $m_C$ are the weight of anode and cathode electrodes, respectively. The energy density increased with increasing the maximum cell voltage. The energy density as high as 110 Wh/kg was obtained from cell #3 at the maximum cell voltage of 3.8 V.

TABLE 2

Summary of electrode and cell parameters for three different cells

| | Composition | Weight (mg) | Swing Voltage (V) | Capacity (mAh) | Energy Density (Wh/kg) |
|---|---|---|---|---|---|
| Cell #1 | | | | | |
| Cathode | AC:CB:PTFE = 10:1:1 | 11 (9.17) | 1.0-3.0 | 0.61 | |
| Anode | HC:SLMP:PVDF = 10:1:0.6 | 13.3 (11.15) | | 2.66 | |
| Cell | | 24.3 | 1.0-3.0 | 0.61 | 50 (theory), 48.6 (exp.) |
| Cell #2 | | | | | |
| Cathode | AC:CB:PTFE = 10:1:1 | 21 (17.5) | 1.45-3.2 | 1.02 | |
| Anode | HC:SLMP:PVDF = 10:1:0.55 | 14 (11.1) | | 2.2 | |
| Cell | | 35 | 1.45-3.2 | 1.02 | 68 (theory), 63 (exp.) |
| Cell #3 | | | | | |
| Cathode | AC:CB:PTFE = 10:1:1 | 22 (18.3) | 1.64-3.8 | 1.32 | |
| Anode | HC:SLMP:PVDF = 10:1:0.55 | 18 (14.3) | | 2.2 | |
| Cell | | 35 | 1.64-3.8 | 1.32 | 90 (theory), 110 (exp.) |

AC: activated carbon,
CB: carbon black,
PTFE: polytetrafluoroethylene (Teflon),
HC: hard carbon,
SLMP: stabilized lithium metal powder,
PVDF: polyvinylidene fluoride.
The weight of cathode and anode is the total weight and (activated carbon) and (hard carbon) in cathode and anode, respectively. The energy density is theoretical and (experimental) values.

Figure 12:
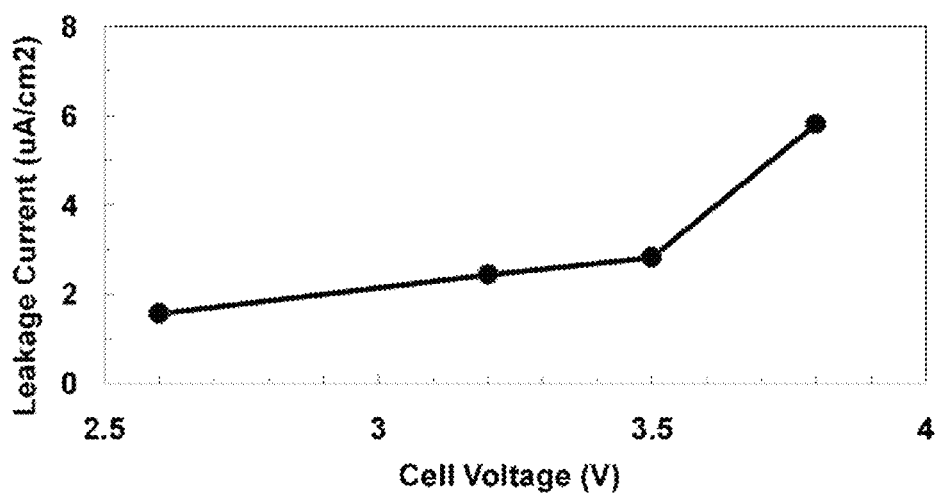
FIG. 12 shows self-discharge current density as a function of the cell voltage.

The energy density as a function of cycle number was measured. FIG. 12 shows energy densities due to the charge and discharge, and energy efficiency which was defined as the ratio between the discharge and charge capacities. From the cycle studies, it can be seen that the capacity of cell #3 decayed much more rapidly than that of cell #1. It is believed that the capacity decay is mainly due to the electrolyte decomposition and solid electrolyte interface (SEI) layer deposition. The reason that cell #3 decayed at a fast rate is due to the high content of Li in cell #3; therefore, the anode potential of cell #3 was lower than that of cell #1, because the lower potential promoted the SEI layer formation on the anode.

The cell leakage current density was measured at different cell voltages. The cell was charged to a design voltage and hold at that voltage until the charge current was less than 1 mA, then the decay of open-circuit voltage of the cell was monitored. The leakage current was calculated according to:

$$i_{leakage} = C \frac{\Delta V}{\Delta t} \quad (10)$$

where, C is the average capacitance of the cell. FIG. 10 shows the leakage current density as a function of the cell voltage. It can be seen that the leakage current increased with increasing the cell voltage; however, when the cell voltage is greater than 3.5 V, the leakage current increases at a more significant rate.

Figure 13:
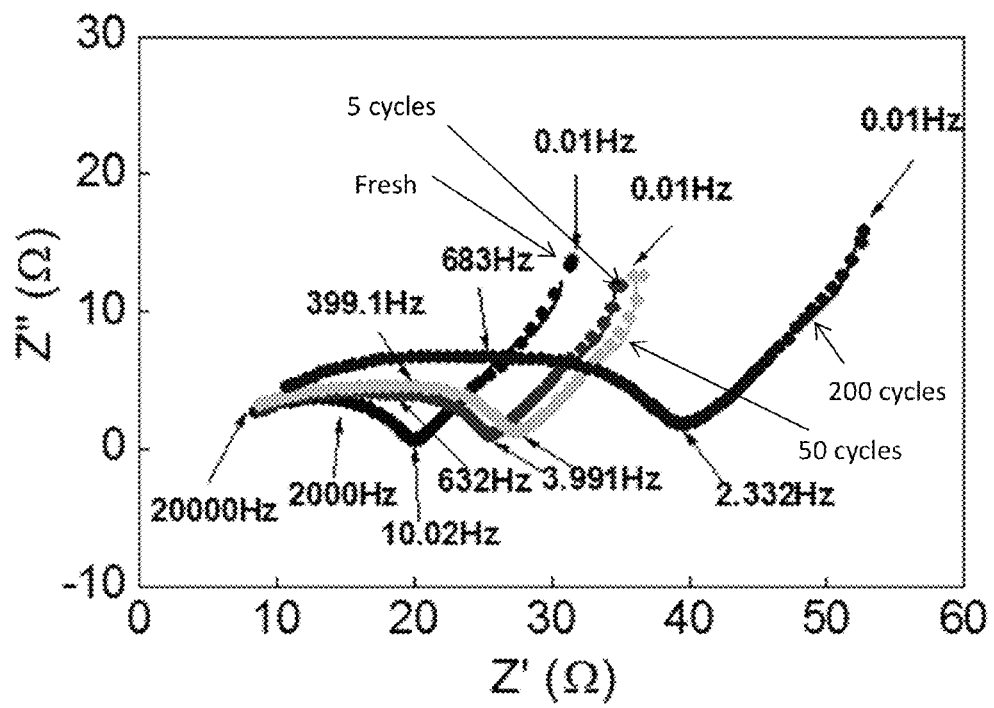
FIG. 13 shows a comparison of the experimental spectra for a Li-ion capacitor at different cycles in a frequency range from 10 mHz to 20 kHz. The dots are experimental results and lines are the fitting results using an equivalent circuit model.

Internal resistance of Li-ion cell was measured using ac impedance spectra in a frequency range of 0.01 Hz-20 kHz. The electrochemical impedance spectra (EIS) for the cell after different cycles were shown in FIG. 13 and were fitted using an equivalent circuit model of FIG. 14 which was used to describe Li-ion batteries. In FIG. 13, the dots are experimental results and lines are the fitting results. In the equivalent circuit, $R_s$ represents ohmic resistance due to the ionic resistance of separator and electrical resistance from electrodes and contact resistance between electrodes and current collectors, $R_i$–$C_i$ (i=1-3) pair represents the SEI layers, $R_{ct}$ represent the charge transfer resistance, $C_{dl}$ represents the double layer capacitance, and $Z_W$ represents the Warburg element described ion diffusion in porous electrodes. Table 3 summarizes the fitting parameters. It can be seen that SEI resistance ($R_i$) and charge transfer resistance ($R_{ct}$) all increased with increasing the cycle numbers. This result is consistent with the observation of cell capacity decay with cycles.

The foregoing results demonstrate that an energy density as high as 110 Wh/kg based on weight of electrode materials can be achieved. However, these results also showed that the capacity decayed rapidly during the first hundred cycles due to the SEI layer growth at anode surface, which was confirmed by EIS measurements.

Example 2

Figure 15:
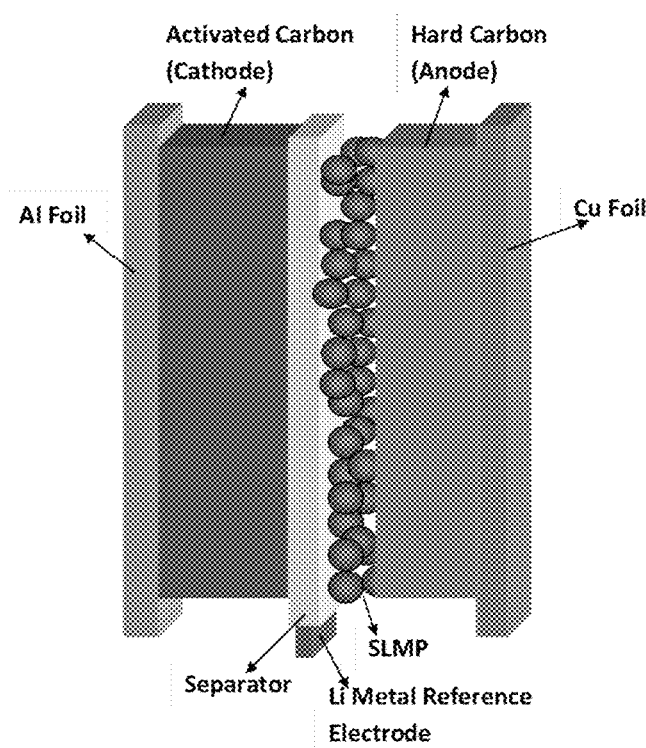
FIG. 15 is a schematic diagram of an activated carbon/SLMP surface applied hard carbon Li-ion capacitor configuration.

FIG. 15 shows the schematic diagram of a constructed Li-ion capacitor. The anode electrode was made with mixture of hard carbon (HC), carbon black (CB), and polyvinylidene fluoride (PVDF) as binder at a ratio of 90:3:7 by weight. The cathode electrode was made with mixture of activated carbon (AC), CB, and PVDF as binder at a ratio of 85:8:7 by weight. The stabilized lithium metal powder (SLMP) was applied onto the surface of prefabricated hard carbon anode electrodes. The SLMP, made by FMC Lithium, is a Li powder with a passivation layer at surface and can be safely handled in a dry room atmosphere. The size of the powder is in a range of 10-200 nm. The CB was added in both electrodes in order to improve the electrical conductivity. The electrolyte was 1.2 M $LiPF_6$ in ethylene carbonate (EC):diethyl carbonate (DEC):propylene carbonate (PC) at a ratio of 3:4:1 by weight. The copper and aluminum foils were used as current collectors of anode and cathode electrodes, respectively. Three-electrode Li-ion capacitor cells were assembled with Li metal as the reference electrode to show the anode and cathode potential changes versus $Li^+/Li$. Two-electrode Li-ion capacitor cells were assembled in order to characterize the energy density, power density, and cycle life.

A three-electrode cell was discharged and charged from 1.8 V to 3.9 V under a constant current density while the anode and cathode potentials were monitored. The two-electrode cell was discharged and charged under a constant current density for over 600 cycles and was also discharged and charged under different current densities and power densities.

Figure 16A:
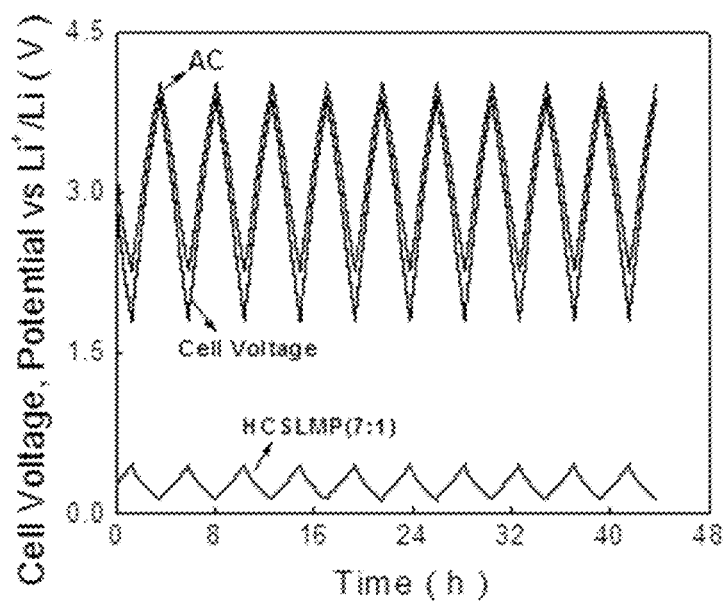
FIGS. 16A and 16B show, respectively, Galvanostatic charge-discharge profiles of Li-ion capacitors during cycling from three electrodes test cell with Li metal reference electrode at a constant current density of 0.2 mA/cm² from 1.8 to 3.9 V and two electrodes test cell at a constant current density of 0.8 mA/cm² from 2.0 to 3.9 V.

FIG. 16A shows the galvanostatic charge-discharge profile from a three-electrode cell in the voltage range from 1.8 to 3.9 V under a constant current density 0.2 mA/cm². The detailed material compositions of electrodes are listed in Table 4.

TABLE 4

Summary of electrode and cell parameters for three electrodes and two electrodes cells

| Three-electrode cell | Composition | Weight (mg) | Swing Voltage (V) |
|---|---|---|---|
| Anode | HC:CB:PVDF = 90:3:7 | 35 | 0.47-0.12 |
|  | SLMP on anode surface | 5 |  |
| Cathode | AC:CB:PVDF = 85:8:7 | 17 | 2.27-4.02 |
| Cell |  | 57 | 1.8-3.9 |

TABLE 3

Fitting Parameters for Example 1

| | $R_{el}$ (Ω) | R1 (Ω) | $C_1$ (F) | $R_2$ (Ω) | $C_2$ (F) | $R_3$ (Ω) | $C_3$ (F) | $R_{ct}$ (Ω) | $C_{dl}$ (F) | $R_W$ (Ω) | $T_W$ (s) | $P_W$ |
|---|---|---|---|---|---|---|---|---|---|---|---|---|
| | | | SEI Layers | | | | | | | $Z_W$ | | |
| Fresh | 6.7 | 3.56 | $2.4 \times 10^{-6}$ | 4.5 | $1.0 \times 10^{-5}$ | 3.6 | $6.1 \times 10^{-5}$ | 1.249 | $1.2 \times 10^{-3}$ | 36.7 | 62.6 | 0.5 |
| 5 cycles | 7.1 | 4.1 | $2.4 \times 10^{-6}$ | 5.1 | $1.2 \times 10^{-5}$ | 5.1 | $8.1 \times 10^{-5}$ | 3.649 | $6.3 \times 10^{-4}$ | 30.9 | 51.9 | 0.5 |
| 50 cycles | 6.6 | 4.8 | $2.0 \times 10^{-6}$ | 5.7 | $1.2 \times 10^{-5}$ | 6.5 | $8.2 \times 10^{-5}$ | 3.266 | $1.0 \times 10^{-3}$ | 29.4 | 42.5 | 0.5 |
| 200 cycles | 8.2 | 7.0 | $1.7 \times 10^{-6}$ | 9.2 | $8.7 \times 10^{-6}$ | 10.0 | $7.1 \times 10^{-5}$ | 4.292 | $1.3 \times 10^{-3}$ | 43.1 | 55.3 | 0.5 |

TABLE 4-continued

Summary of electrode and cell parameters for three electrodes and two electrodes cells

| Two-electrode cell | Composition | Weight (mg) |
|---|---|---|
| Anode | HC:CB:PVDF = 90:3:7 | 7 |
| | SLMP on anode surface | 1 |
| Cathode | AC:CB:PVDF = 85:8:7 | 8 |
| Separator | Celgard 3501 | 3.5 |
| Electrolyte | 1.2M LiPF$_6$ EC:DEC:PC = 3:4:1 | 24 |
| Current Collector | Cu foil (anode) | 5.5 |
| | Al foil (cathode) | 3 |
| Total | | 52 |

AC: activated carbon,
CB: carbon black,
HC: hard carbon,
SLMP: stabilized lithium metal powder,
PVDF: polyvinylidene fluoride.
The energy density is experimental values, respectively.

Figure 16B:
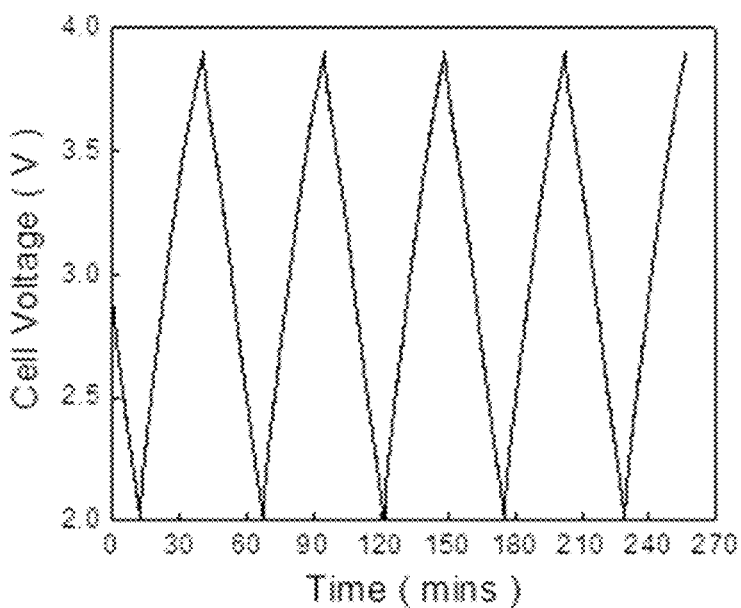

The potential of the positive and negative electrodes has been recorded separately vs. the Li$^+$/Li reference electrode during the charge-discharge. It can be observed that the anode and cathode potentials swung from 0.47 to 0.12 V and 2.27 to 4.02 V vs. Li$^+$/Li, respectively. The potential change of the anode was much less than that of the cathode due to the large capacity of anode. Since the reversible Li intercalation process occurred in HC anode electrode, it is obvious that the performance including the cycle life and power density would be limited by the anode electrode. FIG. 16B shows the voltage profile of the two-electrode cell being charged and discharged from 2.0 to 3.9 V at current density 0.8 mA/cm$^2$. The open-circuit voltage (OCV) of both the three-electrode and two-electrode cells was about 2.9 V and the specific energy is about 82 Wh/kg based on the weight of electrode materials. The weights of electrodes, separator paper, current collectors, and electrolyte in electrodes and separator were measured and listed in Table I. Half of the weights of the current collectors were considered because in the packaged cell, both sides of current collectors were loaded with electrode materials. The specific energy of the Li-ion capacitors was estimated to be about 25 Wh/kg. It should be pointed out that the specific energy would be further reduced due to the requirement of package materials. The typical package efficiency is about 80%.

The charge transfer mechanism of Li-ion capacitors is fundamentally different to previous capacitors including traditional symmetric double-layer capacitors and asymmetric cells has been previously demonstrated, in that less or even no salt in the electrolyte will be consumed during the capacitor cycling as shown in FIGS. 1A and 1B.

Figure 17A:
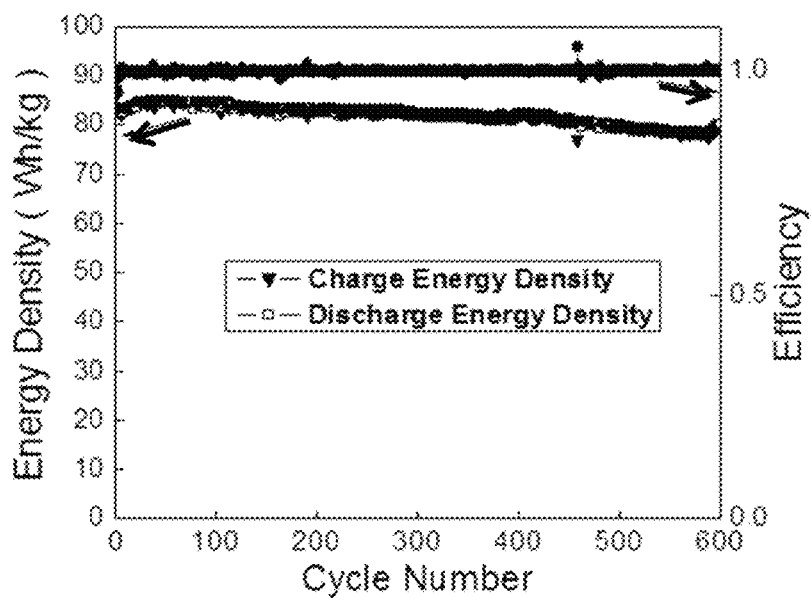
FIG. 17A shows the specific charge and discharge energy, and the energy efficiency as a function of cycle number for the two electrodes test cell.
Figure 17B:
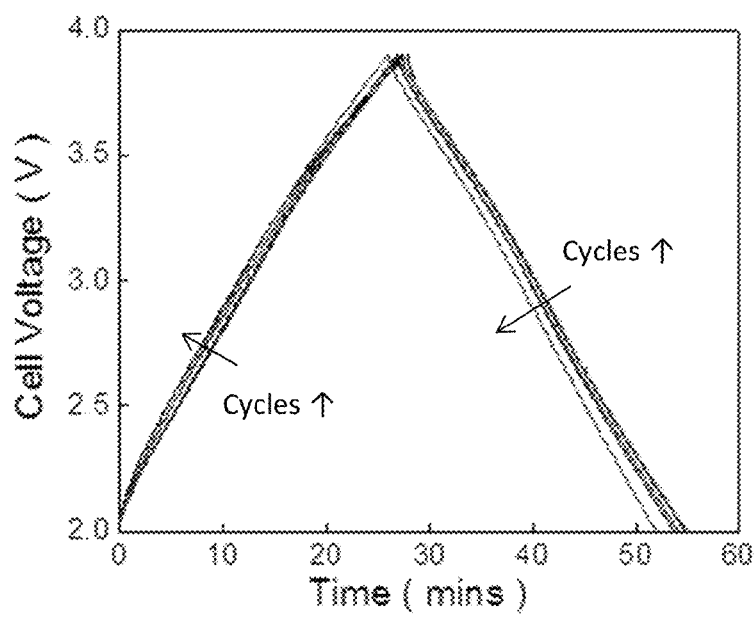
FIG. 17B shows the voltage profiles of the two electrodes Li-ion capacitor cell for the $1^{st}$, $10^{th}$, $50^{th}$, $100^{th}$, $300^{th}$ and $600^{th}$ cycles.

In order to obtain information concerning the long term stability of the Li-ion capacitor, the charge and discharge cycles were performed from 2.0 to 3.9 V. FIG. 17A shows the charge and discharge specific energy as a function of the cycle number for charge-discharge cycling and round-trip energy efficiency. It can be seen that after 600 cycles, the capacity degradation is less than 3%. FIG. 17B displays charge and discharge curves for the 1$^{st}$, 10$^{th}$, 50$^{th}$, 100$^{th}$, 300$^{th}$ and 600$^{th}$ cycles for the Li-ion capacitor cell. The shape of the charge and discharge curve and the charge and discharge time do not appreciably change as the cycle number increases which also demonstrate the long cycle stability for Li-ion capacitor cell. The round-trip energy efficiency closed to 100%.

Figure 14:
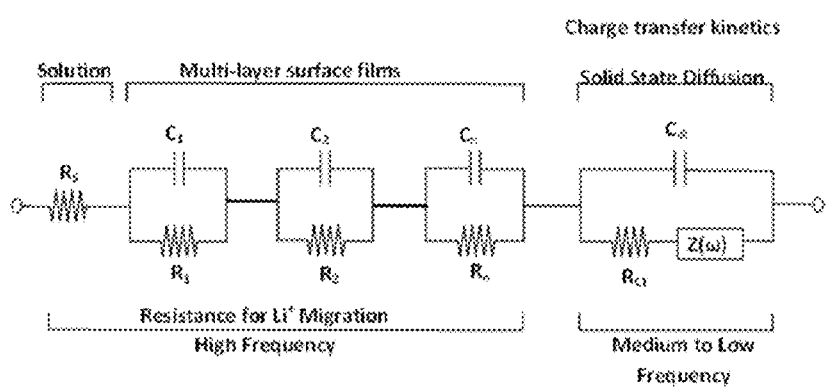
FIG. 14 shows the equivalent circuit model for FIG. 13.
Figure 18:
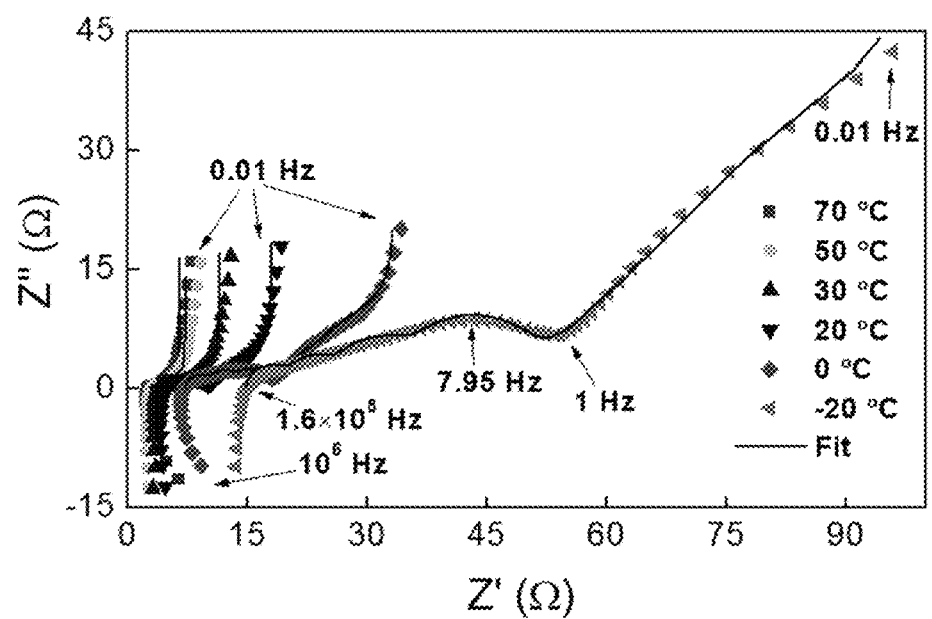
FIG. 18 shows the EIS of Li-ion capacitor measured at different ambient temperatures.

The electrochemical impedance spectra (EIS) were performed to the Li-ion capacitor. These spectra were recorded in the range from 10 mHz to 1 MHz with a signal amplitude of 10 mV. FIG. 18 shows the EIS measured from the Li-ion capacitor at ambient temperatures of −20, 0, 20, 30, 50, and 70° C. All EIS at different ambient temperatures were measured at cell bias voltage of 3.9 V. The EIS were also fitted by an electric equivalent circuit model as shown in FIG. 14. The spectra contain a resistance R$_s$ at the interception of the real axis which can be ascribed to the electrolyte, separator and contacts, and correlates with the ohmic polarization of the cell. At least three overlapping depressed semi-cycles is observed at high to medium frequencies. These semi-cycles are associated with the migration of lithium ion through SEI layers which covers the electrode and have equivalent SEI resistance R$_j$ (j=1-3) and corresponding SEI capacitance C$_j$ (j=1-3). The semi-circle at mid-frequencies is associated with intercalation type reactions and is characterized by charge transfer resistance R$_{CT}$ and the associated double-layer capacitance C$_{dl}$. The low frequency Warburg slope line represents the semi-infinite diffusion of Li-ion in the electrodes and was represented by Z$_W$. The Warburg element Z$_W$ is given by following equation:

$$Z_W = R_W \frac{\coth(j\omega\tau_W)^p}{(j\omega\tau_W)^p} \qquad (11)$$

Table 5 lists the fitting parameters for the cell at different ambient temperatures. It can be seen that all resistance values due to the ohmic resistance (R$_s$), SEI layers (R$_j$, j=1-3), charge transfer (R$_{CT}$), and Warburg element (R$_W$) increased with decreasing temperature. This result is reasonable due to the Li ion conductivity and diffusivity in both liquid and solid phases decreases with decreasing temperature.

TABLE 5

Fitting Paramters for Example 2

| Temp | R$_s$ (Ω) | R$_1$ (Ω) | C$_1$ (F) | R$_2$ (Ω) | C$_2$ (F) | R$_3$ (Ω) | C$_3$ (F) | R$_{CT}$ (Ω) | C$_{dl}$ (F) | R$_W$ (Ω) | τ$_W$ (s) | p |
|---|---|---|---|---|---|---|---|---|---|---|---|---|
| −20° C. | 14.9 | 5 | 1.65 × 10$^{-6}$ | 6 | 2.1 × 10$^{-5}$ | 8.8 | 1.8 × 10$^{-4}$ | 13.8 | 1.4 × 10$^{-3}$ | 164.5 | 94.4 | 0.5 |
| 0° C. | 7.2 | 2.8 | 6 × 10$^{-6}$ | 3.4 | 7.1 × 10$^{-5}$ | 3.8 | 7.2 × 10$^{-4}$ | 1.6 | 0.42 | 45 | 41.5 | 0.5 |
| 20° C. | 4.7 | 2.0 | 9.5 × 10$^{-6}$ | 1.1 | 1.1 × 10$^{-4}$ | 1.1 | 1.4 × 10$^{-3}$ | 0.81 | 0.26 | 22.5 | 20.3 | 0.5 |
| 30° C. | 3.7 | 1.3 | 1.9 × 10$^{-5}$ | 0.27 | 2.9 × 10$^{-4}$ | 0.9 | 3.2 × 10$^{-4}$ | 0.33 | 0.12 | 15.3 | 14.4 | 0.5 |
| 50° C. | 2.9 | 0.83 | 3.8 × 10$^{-5}$ | 0.2 | 1.5 × 10$^{-3}$ | 0.1 | 3.6 × 10$^{-2}$ | 0.06 | 0.28 | 11 | 10.9 | 0.5 |
| 70° C. | 2.5 | 0.58 | 7.2 × 10$^{-5}$ | 0.13 | 6.0 × 10$^{-4}$ | 0.096 | 8.6 × 10$^{-3}$ | 0.04 | 0.12 | 9.5 | 9.3 | 0.5 |

Figure 19B:
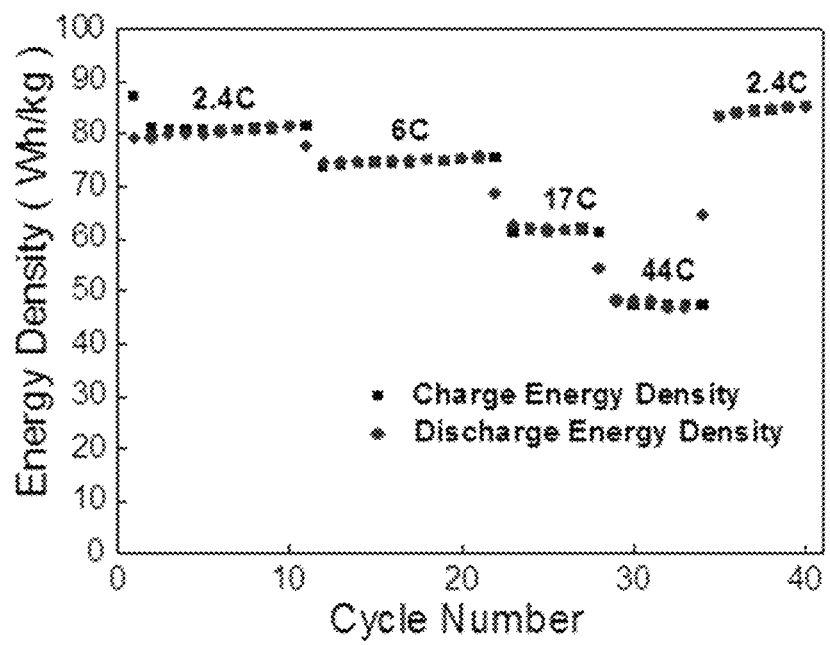
Figure 19B:
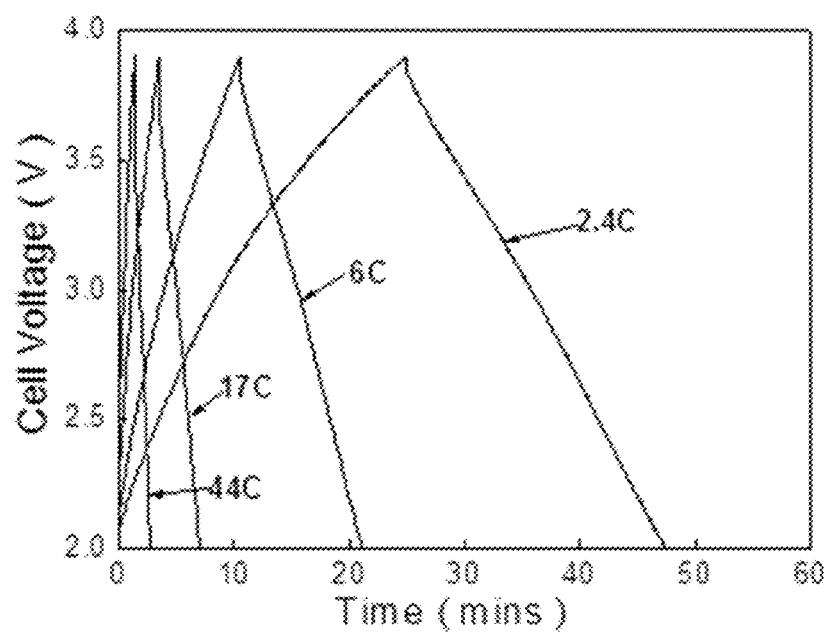
Figure 20:
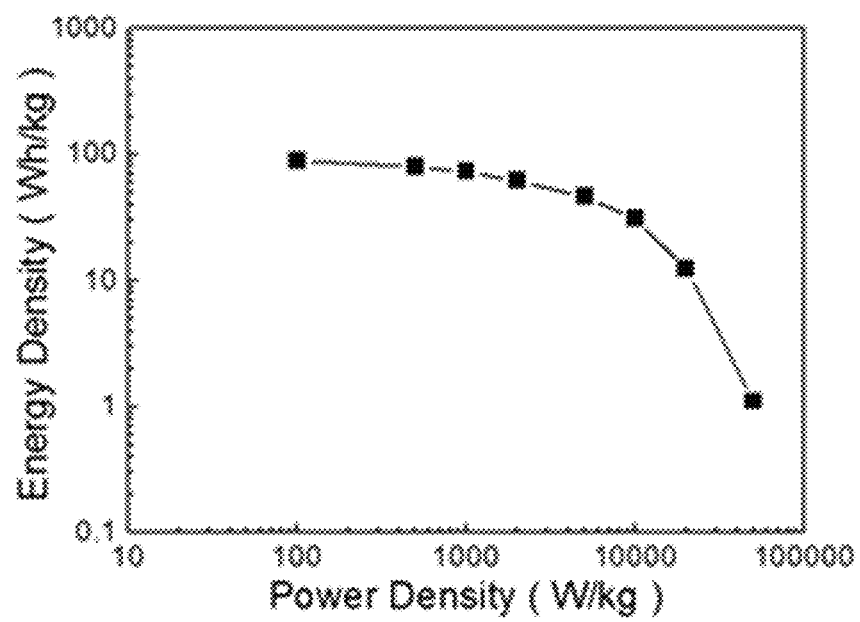
FIG. 20 shows the specific energy as a function of specific power based on weight of anode and cathode electrodes.

Cycling performance at various charge and discharge rates for the Li-ion capacitor cell is shown in FIG. 19A. In the first 11 cycles, the test cell was charged and discharged under 2.4 C rate achieving a specific discharge energy about 82 Wh/kg with good cycle stability. When the cell was operated at the 6 C and 17 C charging and discharging rates, the specific discharge energies were 74 Wh/kg and 62 Wh/kg with stable cycle life, respectively. Even at the 44 C rate, the cell still delivered specific discharge energy of about 48 Wh/kg, respectively. After 34 cycles, the cell still had a specific discharge energy of 82 Wh/kg when reset to 2.4 C charging and discharging rate, which is almost the same as the specific discharge energy prior the high rate charge and discharge. The high rate performance and good specific energy retention at various charging and discharging rates indicate that this Li-ion capacitor cell was capable of delivering and storing high power. FIG. 19B shows the charge and discharge curves at current densities of 0.79 mA/cm$^2$, 1.58 mA/cm$^2$, 3.16 mA/cm$^2$, and 6.32 mA/cm$^2$. The Li-ion capacitor cell was also discharged under constant power mode and FIG. 20 shows the Ragone plot based on the weight of electrode materials only.

Figure 21A:
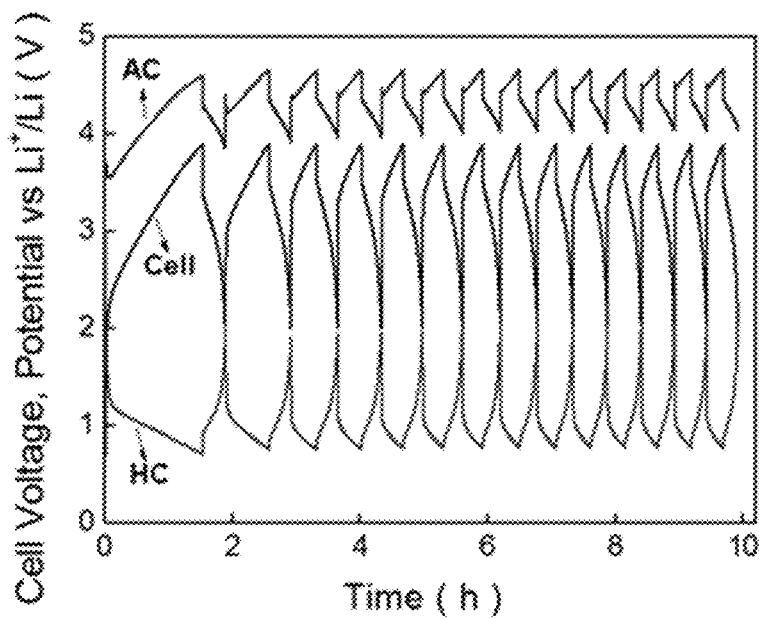
FIGS. 21A and 21B show, respectively, Galvanostatic charge-discharge profiles of HC-AC capacitor during cycling from three electrodes test cell with Li metal reference electrode at a constant current 0.4 mA/cm² from 2.0 to 3.9 V, and calculated energy density (based on electrode materials only) and round-trip energy efficiency.
Figure 21B:
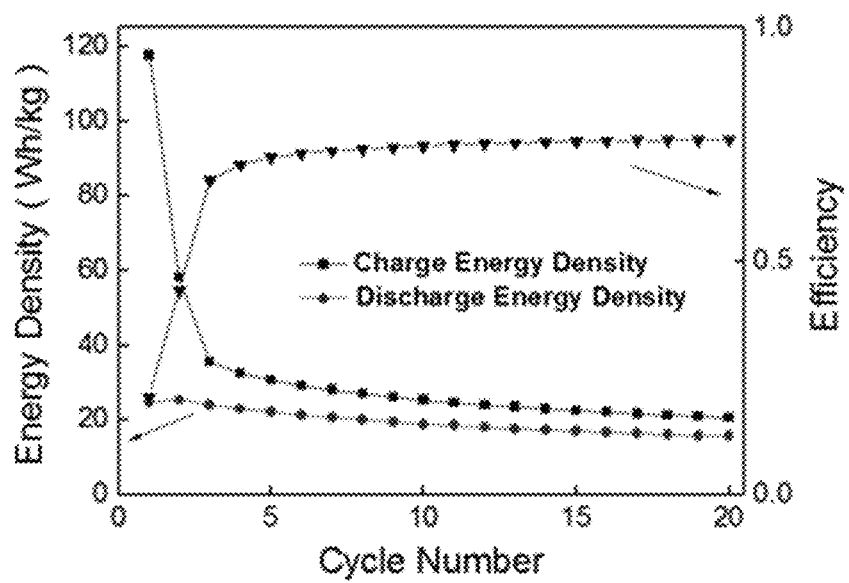

An EC capacitor structure with activated carbon cathode and graphite or graphitic carbon anode was demonstrated previously. In the previous work, no SLMP was used in the capacitor. The difference between our Li-ion capacitor and previous EC capacitors is the resource of the Li ions for the electrodes. In the previous EC capacitor, the Li ions came exclusively from the electrolyte; while the Li-ion capacitor came mainly from the SLMP. In addition, the open circuit voltage of the cell was nearly zero and the anode electrode potential was about 3 V vs. Li/Li$^+$. FIG. 21A shows potentials of anode and cathode electrodes vs. Li/Li$^+$ from an EC capacitor made with anode (AC 23 mg), cathode (HC 18 mg), and electrolyte (1.2 M LiPF$_6$ in EC/DEC/PC=3/4/1 by weight). The configuration of the capacitor is similar to the Li-ion capacitors discussed above, but without SLMP in the anode electrode. It can be seen that the initial potentials of both anode and cathode electrodes were about 3 V vs. Li/Li$^+$. Due to the high potential of the anode electrode, the cathode electrode was pushed to a potential about 4.6 V vs. Li/Li$^+$ which is out of the upper limit of the electrochemical stable potential. The rapid capacitance degradation and low round-trip energy efficiency indicated non-reversible reactions occurred during the charge and discharge. The large voltage drop or jump during the current switch from charge to discharge or discharge to charge, respectively, was due to high ohmic resistance ($R_s$ in FIG. 14) contributed by the electrolyte, because the Li ion concentration in the electrolyte was significantly reduced. The large amount of Li ions in electrolyte intercalated into HC anode during the first charge, but less than ⅓ of Li ions de-intercalated from anode.

Another carbon/carbon Li-ion capacitor configuration was also introduced with activated carbon as the cathode, graphite or graphitic carbon as the anode, and Li foil as the Li-ion source for the anode. The main difference between this work and previous one is that the Li-ion capacitor presented in this paper formulated with two electrodes-anode and cathode, just like conventional batteries and EC capacitors, but other Li-ion capacitors formulated with three electrodes-anode, cathode, and Li electrode, and pre-doped of Li to anode was required. After the pre-doping, the operational principal of both Li-ion capacitors are similar.

The Li-ion capacitor discussed above can achieve a specific energy of 82 Wh/kg based on the weight of electrodes and a specific energy of 25 Wh/kg based on the weight of combined electrodes, separator, electrolyte, and current collectors.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Other configurations are also possible. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

I claim:

1. An electrochemical capacitor having an initial charged state and a cycled charged state, comprising:
    an anode comprising a first mixture, the first mixture comprising a first plurality of electrically conductive carbon-comprising particles having a first average porosity;
    a cathode comprising a second mixture, the second mixture comprising a second plurality of electrically conductive carbon-comprising particles having a second average porosity greater than said first average porosity; and
    an electrolyte physically and electrically contacting said anode and said cathode,
    wherein the first mixture in the cycled charged state is substantially free of lithium metal particles and further comprises a plurality of lithium ions intercalating the first plurality of carbon comprising particles, and wherein a mass ratio of said cathode and said electrolyte is less than 1.

2. The electrochemical capacitor of claim 1, wherein the first mixture in the initial charged state further comprises a plurality of lithium metal particles mixed with said first plurality of carbon-comprising particles, and wherein the first plurality of carbon-comprising particles in the initial charged state are substantially free of lithium ions.

3. The electrochemical capacitor of claim 2, wherein the mass ratio of lithium metal particles and said first plurality of particles is at least $2.59 \times 10^{-4} \, c_C$, wherein $c_C$ is the specific capacity of the first plurality of carbon-comprising particles.

4. The electrochemical capacitor of claim 2, wherein the mass ratio of lithium metal particles and said first plurality of particles is at least $2.59 \times 10^{-4} \, c_C * 1.2$, wherein $c_C$ is the specific capacity of the first plurality of carbon-comprising particles.

5. The electrochemical capacitor of claim 1, wherein the first plurality of carbon-comprising particles further comprise a plurality of hard carbon particles.

6. The electrochemical capacitor of claim 1, wherein the first plurality of carbon-comprising particles consist of carbon-comprising particles selected from the group consisting of hard carbon, graphitic carbon, and carbon microbeads.

7. The electrochemical capacitor of claim 1, wherein said second plurality of carbon-comprising particles consist of a plurality of activated carbon particles.

8. The electrochemical capacitor of claim 7, wherein said plurality of activated carbon particles are bound by a binder.

9. The electrochemical capacitor of claim 7, wherein said plurality of activated carbon particles are bound by a network of carbon-comprising fibers.

10. The electrochemical capacitor of claim 7, wherein said network of carbon-comprising fibers comprises a network of carbon nanotubes.

11. The electrochemical capacitor of claim 1, wherein said second plurality of carbon-comprising particles comprises a plurality of activated carbon particles, and stabilized lithium metal powder.

12. The electrochemical capacitor of claim 5, wherein said second plurality of carbon-comprising particles comprises a plurality of activated carbon particles, and stabilized lithium metal powder.

* * * * *